US009426358B2

(12) United States Patent
Lehtiniemi et al.

(10) Patent No.: US 9,426,358 B2
(45) Date of Patent: Aug. 23, 2016

(54) DISPLAY OF VIDEO INFORMATION

(71) Applicant: Nokia Corporation, Espoo (FI)

(72) Inventors: Arto Juhani Lehtiniemi, Lempaala (FI); Jussi Artturi Leppanen, Tampere (FI); Antti Johannes Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 373 days.

(21) Appl. No.: 14/204,176

(22) Filed: Mar. 11, 2014

(65) Prior Publication Data
US 2015/0264256 A1  Sep. 17, 2015

(51) Int. Cl.
| H04N 5/232 | (2006.01) |
| H04N 7/18 | (2006.01) |
| G06K 9/78 | (2006.01) |
| H04N 21/2187 | (2011.01) |
| H04N 21/41 | (2011.01) |
| H04N 21/414 | (2011.01) |
| H04N 21/44 | (2011.01) |

(Continued)

(52) U.S. Cl.
CPC ............ *H04N 5/23229* (2013.01); *B60R 1/00* (2013.01); *G06K 9/78* (2013.01); *H04N 5/23293* (2013.01); *H04N 7/183* (2013.01); *H04N 21/2187* (2013.01); *H04N 21/4122* (2013.01); *H04N 21/41422* (2013.01); *H04N 21/44008* (2013.01); *H04N 21/4788* (2013.01); *B60K 2350/1068* (2013.01); *B60R 2300/202* (2013.01); *B60R 2300/205* (2013.01); *B60R 2300/50* (2013.01); *B60R 2300/60* (2013.01); *B60R 2300/70* (2013.01)

(58) Field of Classification Search
CPC ............. G06F 3/013; G06K 9/00597; G06K 9/00671; H04N 13/0468; H04N 13/0484; A61B 3/113
See application file for complete search history.

(56) References Cited

U.S. PATENT DOCUMENTS

2003/0174773 A1  9/2003 Comaniciu et al.
2008/0129839 A1  6/2008 Asukai et al.
(Continued)

FOREIGN PATENT DOCUMENTS

| CN | 202583685 | 12/2012 |
| EP | 2431895 A1 | 3/2012 |
| WO | 2013056187 A1 | 4/2013 |

OTHER PUBLICATIONS

Geek, Humphries, Matthew, "Samsung Reinvents the Window Using a Transparent Touchscreen Display", Jan. 16, 2012, 4 pages.

(Continued)

*Primary Examiner* — Sath V Perungavoor
*Assistant Examiner* — Clifford Hilaire
(74) *Attorney, Agent, or Firm* — Banner & Witcoff, Ltd.

(57) ABSTRACT

A method comprising receiving information indicative of an object sharing input, receiving video information from a camera module that is configured to have a field of capture that corresponds with a field of view through a see through display, identifying at least one object representation comprised by the video information, the object representation being a visual representation of an object that within the field of view of the see through display, causing display of the video information on a different display, determining that the video information fails to comprise the object representation, and terminating display of the video information on the different display based, at least in part, on the determination that the video information fails to comprise the object representation is disclosed.

18 Claims, 14 Drawing Sheets

(51) Int. Cl.
*H04N 21/4788* (2011.01)
*B60R 1/00* (2006.01)

(56) References Cited

U.S. PATENT DOCUMENTS

| | | | |
|---|---|---|---|
| 2012/0154591 A1* | 6/2012 | Baur | B60R 1/00 |
| | | | 348/148 |
| 2013/0050070 A1* | 2/2013 | Lewis | A61B 3/113 |
| | | | 345/156 |
| 2013/0083063 A1* | 4/2013 | Geisner | G06T 19/006 |
| | | | 345/633 |
| 2013/0219303 A1 | 8/2013 | Eriksson et al. | |

OTHER PUBLICATIONS

Lehtiniemi et al., "User Interface Transfer", U.S. Appl. No. 13/780,932, filed Feb. 28, 2013, 47 pages.
Ommer et al., "Compositional Object Recognition, Segmentation, and Tracking in Video", Institute of Computational Science, ETH Zurich 8092 Zurich, Switzerland, retrieved May 24, 2014, http://hci.iwr.uni-heidelberg.de/Staff/bommer/papers/ommer.em-mcvpr07.pdf, 16 pages.
Rigg, Jamie, "Transview Touch-Sensitive Transparent Display Case Eyes-on (Video)", Jan. 10, 2013, http://www.engadget.com/2013/01/10/transview-transparent-display-cases, 11 pages.
Ta et al., "SURFTrac: Efficient Tracking and Continuous Object Recognition using Local Feature Descriptors", http://people.csail.mit.edu/kapu/papers/nguyen_cvpr09.pdf, retrieved May 24, 2014, 8 pages.
Toyota, "Toyota Window to the World—Multimedia System", YouTube Video, retrieved May 24, 2014, https://www.youtube.com/watch?v=dl9eqdZpvJU, 1 page.
Corning, "A Day Made of Glass . . . Made Possible by Corning", http://youtu.be/6Cf7IL_eZ38, uploaded Feb. 7, 2011, 4 pages.
Corning, A Day Made of Glass 2: Same Day. Expanded Corning Vision (2012), http://youtu.be/jZkHpNnXLB0, uploaded Feb. 3, 2012, 3 pages.
International Search Report and Written Opinion received in Patent Cooperation Treaty Application No. PCT/FI2015/050149, dated Jun. 11, 2015, 12 pages.

\* cited by examiner

DISPLAY OF VIDEO INFORMATION

TECHNICAL FIELD

The present application relates generally to display of video information.

BACKGROUND

As users have become more accustomed to interacting with electronic apparatuses, users have become more reliant on viewing information by way of their electronic apparatuses. For example, the user may view information captured by the electronic apparatus, received by the electronic apparatus, and/or the like. In some circumstances, the manner in which the user perceives and/or interacts with their environment may be impacted by the manner in which the user interacts with his electronic apparatus. In this manner, it may be desirable to allow for viewing of information in a simple and intuitive manner.

SUMMARY

Various aspects of examples of the invention are set out in the claims.

One or more embodiments may provide an apparatus, a computer readable medium, a non-transitory computer readable medium, a computer program product, and/or a method for receiving information indicative of an object sharing input, receiving video information from a camera module that is configured to have a field of capture that corresponds with a field of view through a see through display, identifying at least one object representation comprised by the video information, the object representation being a visual representation of an object that within the field of view of the see through display, causing display of the video information on a different display, determining that the video information fails to comprise the object representation, and terminating display of the video information on the different display based, at least in part, on the determination that the video information fails to comprise the object representation.

One or more embodiments may provide an apparatus, a computer readable medium, a computer program product, and/or a non-transitory computer readable medium having means for receiving information indicative of an object sharing input, means for receiving video information from a camera module that is configured to have a field of capture that corresponds with a field of view through a see through display, means for identifying at least one object representation comprised by the video information, the object representation being a visual representation of an object within the field of view of the see through display, means for causing display of the video information on a different display, means for determining that the video information fails to comprise the object representation, and means for terminating display of the video information on the different display based, at least in part, on the determination that the video information fails to comprise the object representation.

In at least one example embodiment, the different display is a different see through display, such that the field of view through the see through display fails to correspond with a different field of view through the different see through display.

In at least one example embodiment, the video information is a video stream, and identification of the object representation is performed in relation to a first video stream timestamp.

In at least one example embodiment, the determination that the video stream fails to comprise the object representation is performed in relation to a second video stream timestamp that corresponds with the determination that the video stream fails to comprise the object representation.

In at least one example embodiment, the first video stream timestamp is associated with an earlier time than the second video timestamp.

One or more example embodiments further perform causation of enablement of the camera module, wherein the receipt of the video information from the camera module is based, at least in part, on the enablement of the camera module, and causation of disablement of the camera module, wherein termination of display of the video information is based, at least in part, on the disablement of the camera module.

One or more example embodiments further perform causation of display of the video information on the see through display, based, at least in part, the enablement of the camera module.

One or more example embodiments further perform receipt of information indicative of a camera enablement input, wherein the enablement of the camera module is based, at least in part, on the camera enablement input.

In at least one example embodiment, causation of display of the video information comprises display of a frame that corresponds with a time of the receipt of the camera enablement input, and causation of display of a frame that is subsequently adjacent to the frame that corresponds with the time of the receipt of the camera enablement input based, at least in part, on the receipt of the object sharing input.

In at least one example embodiment, the video information is a video stream, display of the frame that corresponds with the time of the receipt of the camera enablement input corresponds with pausing of the video stream, and causation of display of the frame that is subsequently adjacent to the frame that corresponds with the time of the receipt of the camera enablement input corresponds with unpausing of the video stream.

In at least one example embodiment, the camera enablement input is indicative of a user directive to cause the camera module to become enabled.

In at least one example embodiment, the camera enablement input is a touch input on the see through display.

One or more example embodiments further perform determination that the object sharing input was received within a sharing threshold duration from the receipt of the camera enablement input, wherein causation of display of the video information on the different display is based at least in part, on the determination that the object sharing input was received within the sharing threshold duration from the receipt of the camera enablement input.

One or more example embodiments further perform receipt of information indicative of another camera enablement input, receipt of other video information from the camera module, determination that the sharing threshold duration has elapsed since the receipt of the other camera enablement input, and preclusion of causation of display of the other video information on the different display.

In at least one example embodiment, the video information is a video stream, disablement of the camera module is performed such that the video stream comprises a final video frame, and termination of display of the video stream is performed subsequent to causation of display of the final frame of the video stream on the different display.

In at least one example embodiment, the object sharing input is an input that indicates a user directive to cause the different display to display the video information.

In at least one example embodiment, the object sharing input is indicative of touch input on the see through display, such that the touch input comprises a movement in a direction that corresponds with the different display.

In at least one example embodiment, identification of the object representation comprises performance of object recognition.

One or more example embodiments further perform receipt of information indicative of an object identification input, wherein the identification of the object is based, at least in part, on the object identification input.

In at least one example embodiment, the object identification input is a touch input at a position on the see through display that corresponds with the object in the field of view of the see through display.

In at least one example embodiment, the object sharing input is an object identification input.

In at least one example embodiment, the different display is comprised by a vehicle.

One or more example embodiments further perform determination that the different display has become, at least partially, within a driver field of view, and termination of display of the video information based, at least in part, on the determination that the different display has become within the driver field of view.

One or more example embodiments further perform determination that the different display has become beyond the driver field of view, and causation of display of the video information on the different display based, at least in part, on the determination that the different display has become beyond the driver field of view.

One or more example embodiments further perform determination of the driver field of view.

One or more example embodiments further perform determination of a gaze angle of a driver, wherein the determination of the driver field of view is based, at least in part, on the gaze angle of the driver.

One or more example embodiments further perform rising determination that the gaze angle of the driver corresponds with a location of the different display, wherein the determination that the different display has become within the driver field of view is based, at least in part, on the determination that the gaze angle of the driver corresponds with the location of the different display.

In at least one example embodiment, the see through display is a window on a side of a vehicle, the different display is a different see through display that is a window on an opposite side of the vehicle, and causation of display of the video information on the different display comprises determination of a mirror image representation of the video information, and display of the mirror image representation of the video information.

One or more example embodiments further perform determination that the different display is the different see through display that is the window on the opposite side of the vehicle, wherein the determination of the mirror image representation of the video information is based, at least in part, on the determination that the different display is the different see through display that is a window on an opposite side of the vehicle.

One or more example embodiments further perform receipt of information indicative of a cropping input, and causation of modification of the video information such that at least one dimension of the video information is reduced in accordance with the cropping input.

In at least one example embodiment, the cropping input designates a horizontal constraint, and the modification of the video information comprises removal of visual representations that correspond with a region beyond the horizontal constraint.

In at least one example embodiment, the cropping input designates a vertical constraint, and the modification of the video information comprises removal of visual representations that correspond with a region beyond the vertical constraint.

In at least one example embodiment, the different display is a see through display that is a window, and the causation of display of the video information comprises causation of display of the video information at a position on the window.

One or more example embodiments further perform determination that the window has changed from a closed configuration to a partially opened configuration, determination of a different position on the window based, at least in part, on the partially opened configuration, and causation of display of the video information at the different position on the window.

In at least one example embodiment, the different position is based at least in part on a movement distance of the window from the closed configuration to the partially opened configuration.

In at least one example embodiment, the different position corresponds with transposition of the position by a transposition distance that is substantially equal to the movement distance.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
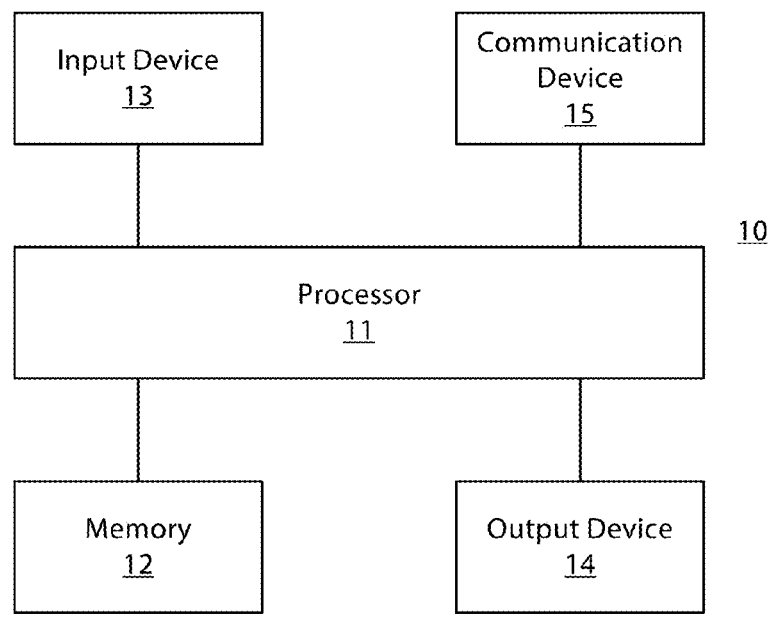
FIG. 1 is a block diagram showing an apparatus according to at least one example embodiment.

An embodiment of the invention and its potential advantages are understood by referring to FIGS. 1 through 14 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, a train, an airplane, a moped, a building, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2:
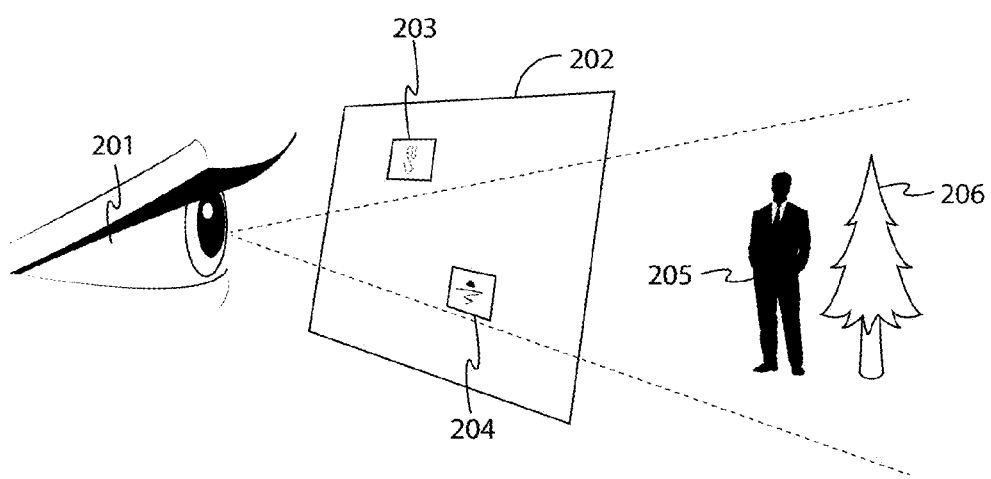
FIG. 2 is a diagram illustrating a see through display according to at least one example embodiment.

FIG. 2 is a diagram illustrating a see through display according to at least one example embodiment. The example of FIG. 2 is merely an example and does not limit the scope of the claims. For example, configuration of the see through display may vary, relationship between the user and the see through display may vary, shape of the see through display may vary, opacity of the see through display may vary, and/or the like.

In modern times, electronic apparatuses are becoming more prevalent and pervasive. Users often utilize such apparatuses for a variety of purposes. For example, a user may utilize an apparatus to view information that is displayed on a display of the apparatus, to perceive information associated with the user's surroundings on the display of the apparatus, and/or the like. In many circumstances, a user may desire to view information associated with an apparatus in a way that is noninvasive, nonintrusive, discreet, and/or the like. In such circumstances, it may be desirable for a display to be a see through display. In at least one example embodiment, a see through display is a display that presents information to a user, but through which objects on an opposite side of the display from the user may be seen. For example, an object on the opposite side of the display may be perceivable through the see through display. A see through display may be comprised by a window, a windshield, a visor, glasses, a head mounted display, and/or the like.

FIG. 2 is a diagram illustrating see through display 202 according to at least one example embodiment. In at least one example embodiment, displaying information on a see through display so that the information corresponds with one or more objects viewable through the see through display is referred to as augmented reality. In the example of FIG. 2, user 201 may perceive objects 205 and 206 through see through display 202. In at least one example embodiment, the see through display may display information to the user. For example, display 202 may display information 203 and information 204. Information 203 and information 204 may be positioned on display 202 such that the information corresponds with one or more objects viewable through see through display 202, such as object 205. For example, information 204 may be displayed at a position on display 202 such that information 204 is aligned with a line of sight between user 201 and object 206. For example, user 201 may perceive information 204 to be overlapping object 206, to partially correspond with object 206 in the user's field of view through display 202, and/or the like. In such an example, information 203 may be associated with, identify, and/or the like, object 205. For example, information 203 may indicate an identity of object 205. In at least one example embodiment, display 202 may be a window comprised by a vehicle, a building, and/or the like. In at least one example embodiment, a field of view of the user is a region of space that is perceivable by the user. In such an example, the field of view of the user may correspond with a field of view of the user through the see through display. For example, the field of view of the user through the display may encompass one or more objects viewable through the see through display. For example, object 205 and object 206 may be within the field of view of user 201 through see through display 202.

Figure 3:
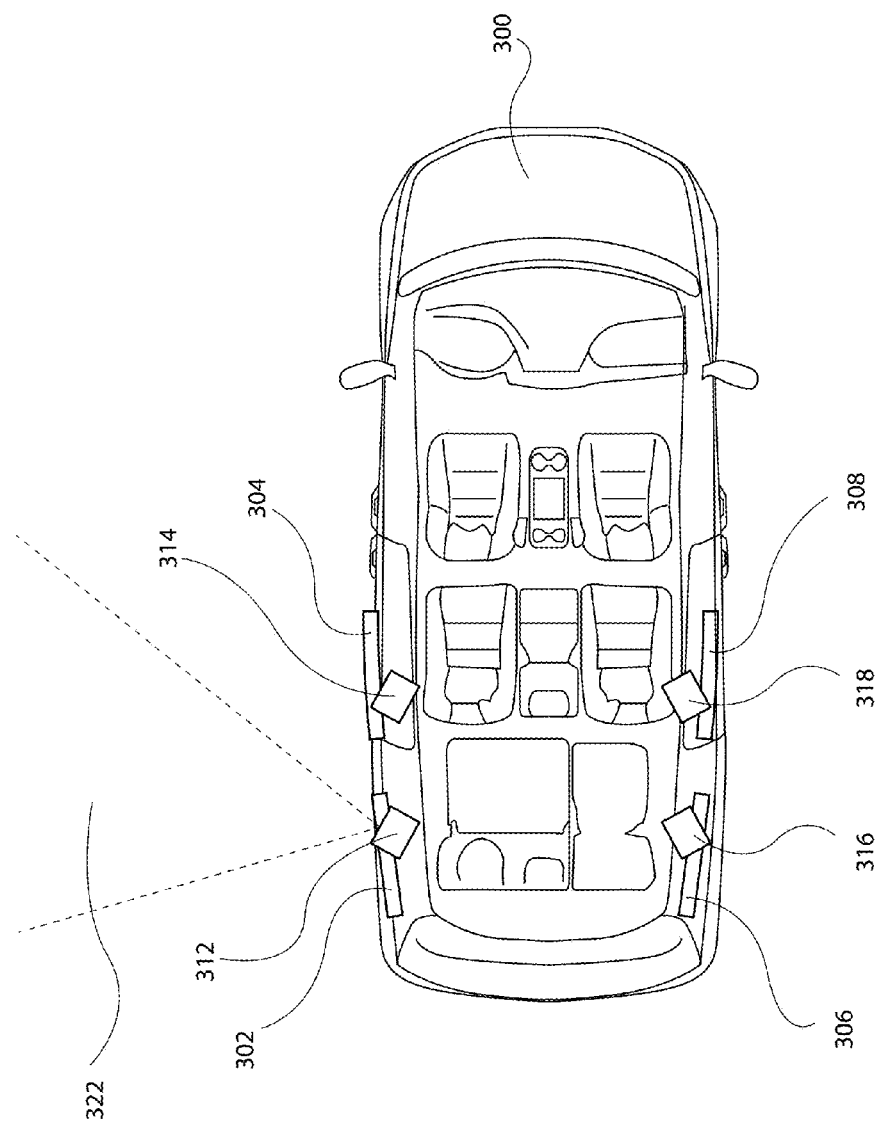
FIG. 3 is a diagram illustrating a vehicle according to at least one example embodiment.

FIG. 3 is a diagram illustrating a vehicle according to at least one example embodiment. The example of FIG. 3 is merely an example and does not limit the scope of the claims. For example, number of camera modules may vary, number of displays may vary, orientation of camera modules may vary, orientation of displays may vary, position of camera modules may vary, position of displays may vary, and/or the like.

In some circumstances, it may be desirable for a see through display to be a window. For example, see through display 202 of FIG. 2 may be a window. In such an example, a person may desire to see objects through the window in conjunction with information displayed on the display.

The example of FIG. 3 depicts vehicle 300. Even though, in the example of FIG. 3, vehicle 300 is an automobile, vehicle 300 may be another vehicle such as an aircraft, a watercraft, a train, a moped, and/or the like. In the example of FIG. 3, vehicle 300 comprises display 302, display 304, display 306, and display 308. It can be seen that each of display 302, display 304, display 306, and display 308 are windows of vehicle 300. In the example of FIG. 3, display 302 is at a position on vehicle 300 that is adjacent to a seat, and display 306 is at a different position on vehicle 300 that is adjacent to a different seat. In this manner, a person sitting in the seat is likely to view objects outside of vehicle 300 by way of display 302, and a different person in the different seat is likely to view objects by way of display 306. In some circumstances the displays may correspond with windows at various positions on the vehicle, such as a front seat window, a back seat window, and/or the like. It can be seen that display 302 is a backseat window, display 304 is a backseat window, display 306 is a backseat window, and display 308 is a backseat window.

In at least one example embodiment, a see through display is a window. For example, the window may be comprised by a building, a vehicle, and/or the like. In at least one example embodiment, such a window may be on a side of the building, the vehicle, and/or the like. For example, it can be seen in the example of FIG. 3 that display 302 is a window on the side of vehicle 300, display 304 is a window on the side of vehicle 300, display 306 is a window on the side of vehicle 300, and display 308 is a window on the side of vehicle 300.

In many circumstances, a person in a vehicle may observe an object through a window. For example, the person may be able to see such an object in a field of view through the window. In such circumstances, it may be desirable to capture visual information that corresponds with the field of view of the person. For example, the person may desire to store the visual information for later viewing, to share the visual information with another person, and/or the like. In this manner, it may be desirable to utilize a camera module that is configured to capture such visual information.

In at least one example embodiment, a camera module may be utilized to capture visual information that corresponds with a field of view through a see through display. In at least one example embodiment, the camera module is configured to have a field of capture that corresponds with the field of view through the see through display. In at least one example embodiment, a field of capture is a region of space that is perceivable by the camera module, such that the camera module may provide information indicative of objects within the field of capture. In at least one example embodiment, the camera module is configured to have a field of capture that corresponds with the field of view through the see through display by way of being positioned, oriented, and/or the like, in alignment with the field of view of the person.

In some circumstances, it may be desirable to allow a user to perform input in relation to a see through display. For example, it may be desirable to allow a user to perform a touch input on the see through display. In at least one example embodiment, the see through display is a touch display. In this manner, the see through display may be configured to receive one or more touch inputs.

In the example of FIG. 3, vehicle 300 comprises camera module 312, camera module 314, camera module 316, and camera module 318. It can be seen that camera module 312 is configured to have a field of capture that corresponds with a field of view from the seat that is adjacent to display 302. In the example of FIG. 3, field of capture 322 identifies the field of capture of camera module 302. In this manner, field of capture 322 corresponds with a field of view from the seat that is adjacent to display 302. It can be seen that camera module 314 is configured to have a field of capture that corresponds with a field of view from the seat that is adjacent to display 304, that camera module 316 is configured to have a field of capture that corresponds with a field of view from the seat that is adjacent to display 306, and that camera module 318 is configured to have a field of capture that corresponds with a field of view from the seat that is adjacent to display 308.

In some circumstances, there may be multiple displays that may be viewed by one or more people. Such displays may be see through displays, opaque displays, and/or the like. For example, even though vehicle 300 comprises display 302, display 304, display 306, and display 308, vehicle 300 may comprise other displays, such as a display mounted to a seat, mounted to a ceiling, and/or the like.

In at least one example embodiment, there are a plurality of see through displays such that a field of view through a see through display fails to correspond with a different field of view through the different see through display. For example, it can be seen in the example of FIG. 3 that a field of view through display 302 fails to correspond with a field of view through display 306, for at least the reason that display 302 and display 306 are on opposite sides of vehicle 300.

In some circumstances, it may be desirable to enable and/or disable a camera module. For example, it may be desirable to reduce circumstances where the camera module is consuming power. In such an example, there may be circumstances where it is desirable to avoid utilization of the camera module. In such circumstance, it may be desirable to avoid camera module power consumption.

In at least one example embodiment, an apparatus causes enablement of a camera module. For example, the apparatus may enable the camera module, may send an enablement directive to a separate apparatus that comprises the camera module, and/or the like. In at least one example embodiment, enablement of the camera module refers to provision of power to the camera module, preparation of the camera module to capture visual information, preparation of the camera module to send visual information to the apparatus, and/or the like.

In at least one example embodiment, an apparatus causes disablement of a camera module. For example, the apparatus may disable the camera module, may send a disablement directive to a separate apparatus that comprises the camera module, and/or the like. In at least one example embodiment, disablement of the camera module refers to removal of power to the camera module, precluding of the capture of visual information by camera module, precluding of the sending of visual information by camera module to the apparatus, and/or the like.

In some circumstances, it may be desirable to allow a user to invoke enablement of the camera module. In such circumstances, it may be desirable to provide for a camera enablement input. For example, it may be desirable to allow the user to perform a camera enablement input to cause enablement of the camera module.

In at least one example embodiment, the apparatus receives information indicative of a camera enablement input. In such an example, the enablement of the camera module may be based, at least in part, on the camera enablement input. In at least one example embodiment, the camera enablement input is indicative of a user directive to cause the camera module to become enabled. In at least one example embodiment, the camera enablement input is a touch input on the see through display.

FIGS. 4A-4D are diagrams illustrating object representations according to at least one example embodiment. The examples of FIGS. 4A-4D are merely examples and do not limit the scope of the claims. For example, correlation between an object and an object representation may vary, type of object may vary, number of objects may vary, number of object representations may vary, and/or the like.

In many circumstances, a person may observe an object through a see through display. It may often be desirable for another person located in a different location to observe this object. For example, the user observing the object may find this object interesting, and wish for another person located in a different location to observe this object. The other person may be unable to see this object because they have no clear view of the object from their location. In such circumstances, the person observing the object may be viewing the object through a see through display with an associated camera module. For example, the person may be viewing the object through see through display 306 which is associated with camera module 316. It may be desirable for the other person who cannot observe the object to see a representation of the object on a different display. For example, the person could cause an object representation of the interesting object to appear on a different display. An object representation may be visual information that is indicative of an object, such as at least part of an image, at least part of a video, and/or the like. It may be desirable in such situations, for a person viewing an interesting object to be able to share the interesting object with the other person by way of the different display.

The example of FIGS. 4A-4D illustrates see through display 402 and different display 410. The example of FIGS. 4A-4D illustrate object 400 as viewed through see through display 402. A person may wish for another person to view a representation of object 400 on different display 410. FIGS. 4A-4D illustrates object representation 412 displayed on different display 410. Object representation 412 is visual information indicative of object 400.

In at least one example embodiment, a camera module is configured to have a field of capture that corresponds with a field of view through a see through display, similarly as described regarding FIG. 3. In this manner, the apparatus may receive video information from the camera module. The video information may comprise a still image, a moving image, a portion of a still image, a portion of a moving image, a video, a portion of a video, and/or the like. In at least one example embodiment, the video information is a video stream. A video stream may be a series of images from a camera module that are contiguously received by the apparatus. In at least one example embodiment, the video information comprises an object representation indicative of an object in the field of capture of the camera module. For example, object representation 412 may comprise an object in the field of capture of the camera module, such as object 400.

In at least one embodiment, the apparatus causes display of the video information on a different display. For example, the apparatus may cause display of video information that comprises object representation 412 on display 410. Different display 410 may be any type of display such as a see through display, an opaque display, and/or the like. In at least one example embodiment, the different display may be a different see through display, such that the field of view through the see through display fails to correspond with a different field of view through the different see through display. In at least one example embodiment, the apparatus receives information indicative of an object sharing input. In this manner, the receipt of the video information may be caused by the object sharing input. For example, in the embodiment illustrated by FIG. 4A, the apparatus may receive an object sharing input that may cause video information to be displayed on different display 410. In at least one example embodiment, the object sharing input is indicative of touch input on the see through display, such that the touch input comprises a movement in a direction that corresponds with the different display. In many cases, it is desirable for the object sharing input to further indicate a particular display on which video information is displayed. For instance, in the example embodiment of FIG. 3, multiple different displays are available to display video information. For example, if a person viewing an object through display 302 of FIG. 3 desired to display video on display 304, they could enter a touch input comprised of a movement in the right direction. If a person viewing an object through display 302 of FIG. 3 desired to display video on display 306, they could enter a touch input comprised of a movement in the up direction. In at least one example embodiment, the different display is comprised by a vehicle. For instance, in the example embodiment of FIG. 3, any of display 302, display 304, display 306, or display 308 could be a different display.

In many instances, it may be desirable to identify an object representation. For example, the user may wish to perceive certain objects that he wishes to share. The apparatus may use the identity of object representation for a number of other control features, such as display initiation, display termination, and/or the like. In at least one example embodiment, identification of the object representation is performed in relation to a first video stream timestamp. A video stream timestamp may be a time reference related to a frame within a video stream that identifies a time when the frame is rendered relative to other frames within the video stream. In at least one example embodiment, the apparatus identifies at least one object representation comprised by the video information. For example, in the example of FIG. 4A, the apparatus may identify object representation 412, which represents object 400.

In at least one example embodiment, identification of the object representation comprises performance of object recognition. For example, the apparatus may utilize face identification to determine a point that corresponds with a part of the visual information that represents a person's face. In another example, the apparatus may identify a moving object in the visual information to determine a point that corresponds with the moving object. In this manner, the point may identify a position within the visual information to be tracked. In many circumstances, it may be desirable for a user to designate an object for the apparatus to identify. In at least one example embodiment, the apparatus receives information indicative of an object identification input. In this manner, the identification of the object may be based, at least in part, on the object identification input. The object identification input may be any type of input that designates an object. In at least one example embodiment, the object identification input is a touch input at a position on the see through display that corresponds with the object in the field of view of the see through display. In at least one embodiment the object sharing input is an object identification input. For example, the object sharing input may be an input that designates an object to be identified.

Figure 4A:
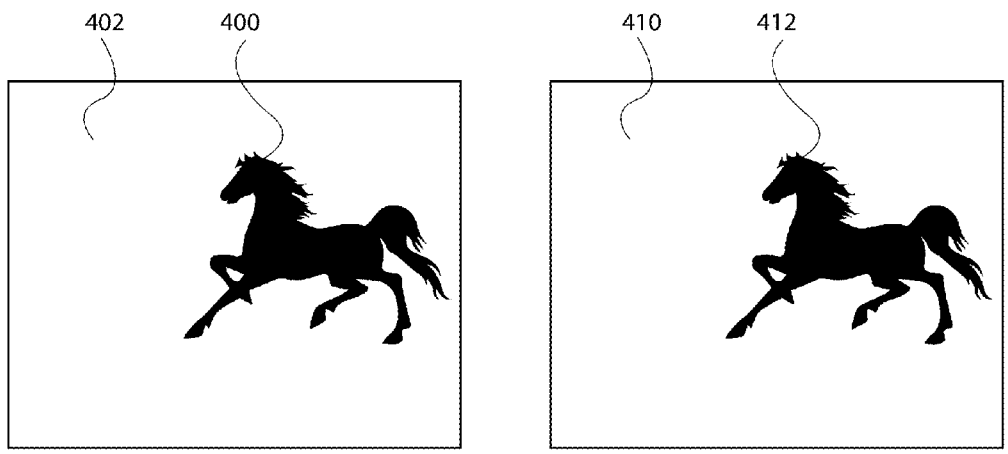
FIGS. 4A-4D are diagrams illustrating object representations according to at least one example embodiment.
Figure 4B:
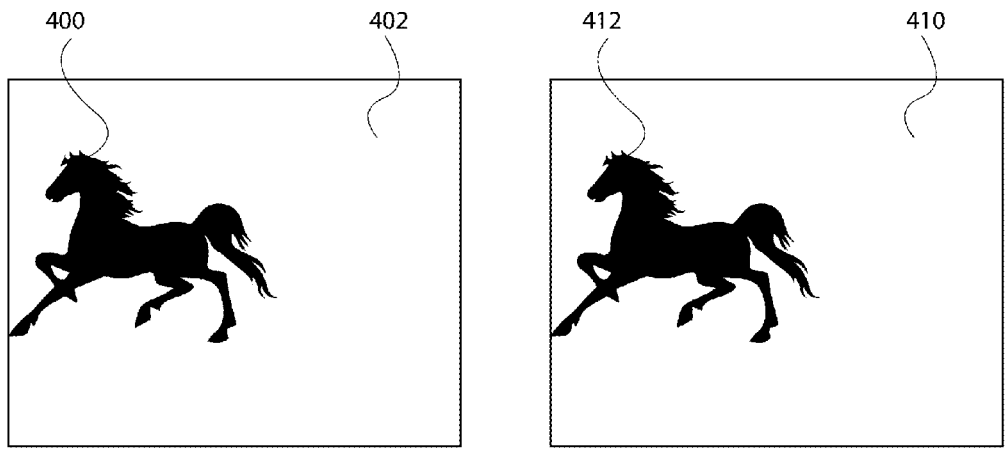
Figure 4C:
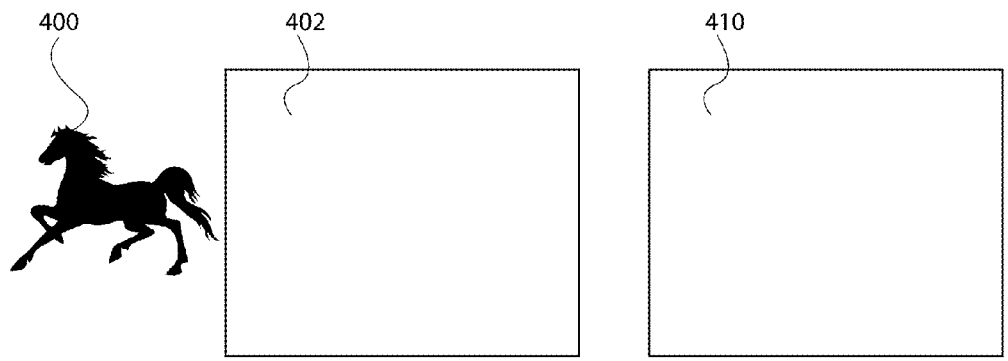
Figure 4D:
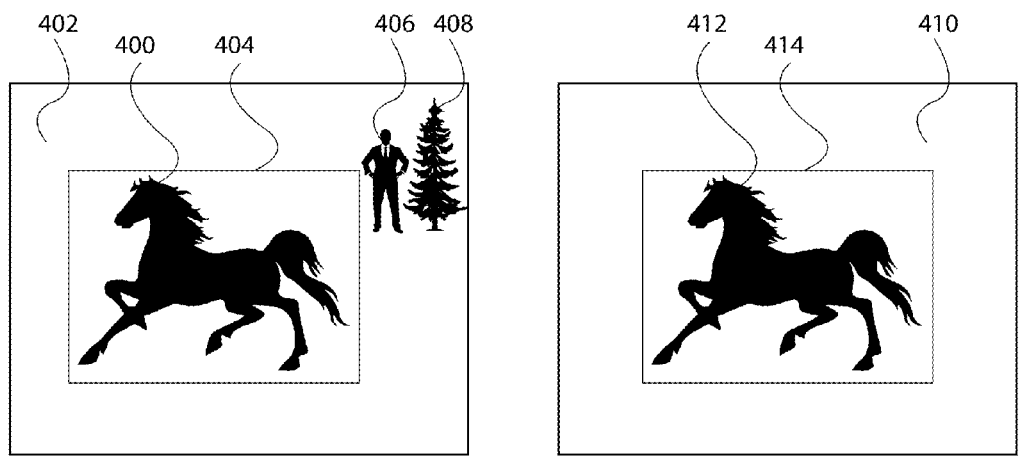

In many circumstances, an interesting object may no longer be within the field of capture of a camera module. In such situations, it may be desirable that any video information being shared on the different display be terminated. For example, the user may have merely intended to share the representation of the object with other people. In this manner, the user may no longer desire to share the video information after the video information fails to comprise the object representation. In at least one example embodiment, the apparatus terminates display of the video information on the different display. In at least one example embodiment, the apparatus determines that the video information fails to comprise the object representation. In this manner, termination of the display of information is based at least in part on a determination that the video information fails to comprise the object representation. For example, in the embodiment depicted by FIGS. 4A-4C, object 400 is progressing from right to left from the perspective of see through display 402. FIG. 4A depicts object 400 at a time before FIGS. 4B and 4C. FIG. 4B depicts object 400 at a time after FIG. 4A and before FIG. 4C. FIG. 4C depicts object 400 at a time after FIGS. 4A and 4B. In the example of FIGS. 4A and 4B, object 400 is still within the field of view of see through display 402. As such, in the examples of FIGS. 4A and 4B, the video information displayed on display 410 comprises object representation 412. In the example of FIG. 4C, it can be seen that object 400 is beyond the field of view of see through display 402, and therefore outside the field of capture of a camera module associated with see through display 402. Consequently, it can be seen in the example of FIG. 4C display of the video information on display 410 has been terminated. In such an example, the apparatus may have terminated display of the video information on display 410 based, at least in part, on the determination that the video information displayed on display 410 fails to comprise object representation 412.

Under some circumstances it may be desirable for the see through display to display video information received from its associated camera module. For example, a person viewing objects through the see through display may wish to view a still image representation of the object viewed through the see through display, view images previously captured by the camera module, and/or the like. In at least one example embodiment, the apparatus causes display of the video information on the see through display, based, at least in part, the enablement of the camera module. Enablement of the camera module may be similar as described in FIG. 3. In at least one example embodiment, the causation of display of the video information comprises display of a frame that corresponds with a time of the receipt of the camera enablement input. In at least one example embodiment, the apparatus causes display of a frame that is subsequently adjacent to the frame that corresponds with the time of the receipt of the camera enablement input. In this manner, display of a frame that is subsequently adjacent to the frame that corresponds with the time of the receipt of the camera enablement input may be based, at least in part, on the receipt of the object sharing input, the camera enablement input, and/or the like.

Under some circumstances, it may be desirable to pause a video stream being displayed on the see through display. For example, the person viewing the stream may wish to look away from the display briefly, but may desire to avoid missing playback of any frames in the video stream. In at least one example embodiment, the video information is a video stream. In such an example, display of the frame that corresponds with the time of the receipt of the camera enablement input may correspond with pausing of the video stream. In such an example, causation of display of the frame that is subsequently adjacent to the frame that corresponds with the time of the receipt of the camera enablement input may correspond with unpausing of the video stream. In many circumstances, it may be desirable to terminate display of video information at the end of a video stream. In at least one example embodiment, the apparatus disables the camera module is performed such that the video stream comprises a final video frame. In such an example, the apparatus terminates display of the video stream subsequent to causation of display of the final frame of the video stream on the different display.

In some circumstances, there may be a delay associated with display of the video stream. For example, the video stream may have been captured prior to display of the video stream on the other display. In such an example, the delay may be due to a user invoked delay, a buffering delay, and/or the like. In such circumstances, it may be desirable to cause termination of display of the video stream in relation to the video stream, as displayed on the different display. For example, it may be desirable to identify a timestamp of the video stream that corresponds with the object representation becoming absent from the video stream.

It may be desirable in many circumstances to determine that the video stream fails to comprise the object representation. For example, when a video stream fails to comprise the object representation, the apparatus may terminate display of video information. In at least one example embodiment, the determination that the video stream fails to comprise the object representation is performed in relation to a second video stream timestamp that corresponds with the determination that the video stream fails to comprise the object representation. In at least one example embodiment, the first video stream timestamp is associated with an earlier time than the second video timestamp. For example, a first video stream timestamp may be associated with the time at FIG. 4A, in which the video stream comprises an object representation such as object representation 412. A second video stream time stamp may be associated with the time at FIG. 4C when the video stream fails to comprise object representation 412. At the time of FIG. 4C, the apparatus may determine that the video stream fails to comprise the object representation of object 400 and terminate display of video information on different display 410, as depicted in FIG. 4C.

In many circumstances, it may be desirable that only a portion of video information within the field of view of a camera module be displayed on a different display. For example, multiple objects may be in the field of view of a camera module that fail to interest the user. For example there may be only one object of interest to the user among many other objects. For instance, in the example of FIG. 4D, objects 400, 406, and 408 are within the field of view of see through display 402. A user may only wish to share object 400 with a different display. In may often be desirable to indicate such a portion of video information to be shared by way of a cropping input. A cropping input may be any type of input that identifies a portion of the video information to be shared. For example, the cropping input may be a touch input that designates a region on the see through display. The apparatus may avoid sending of video information that is beyond such a region. In the example embodiment of FIG. 4D, information indicative of a cropping input is depicted by cropping input information 404. It can be seen that cropping input 404 includes object 400 and excludes objects 406 and 408.

In at least one embodiment the apparatus receives information indicative of a cropping input. In at least one example embodiment, the apparatus causes modification of the video information such that at least one dimension of the video information is reduced in accordance with the cropping input. For instance, in the example of FIG. 4D, the video information has been reduced to the size of cropped video information 414. Video information 414 comprises object representation 412, and fails to comprise representations of objects 406 and 408. In at least one example embodiment, the cropping input designates a horizontal constraint. The horizontal constraint may be a width of an identified region, such as the width of cropping input 404. In such an example, the modification of the video information may comprise removal of visual representations that correspond with a region beyond the horizontal constraint. In at least one example embodiment, the cropping input designates a vertical constraint. The vertical constraint may be a width of an identified region, such as the height of cropping input 404. In such an example, the modification of the video information may comprise removal of visual representations that correspond with a region beyond the vertical constraint. It can be understood from FIG. 4D that cropped video information 414 comprises video information bound by a horizontal and vertical constraint defined by cropping input 404 and excludes video information beyond the region of cropping input 404.

Figure 5A:
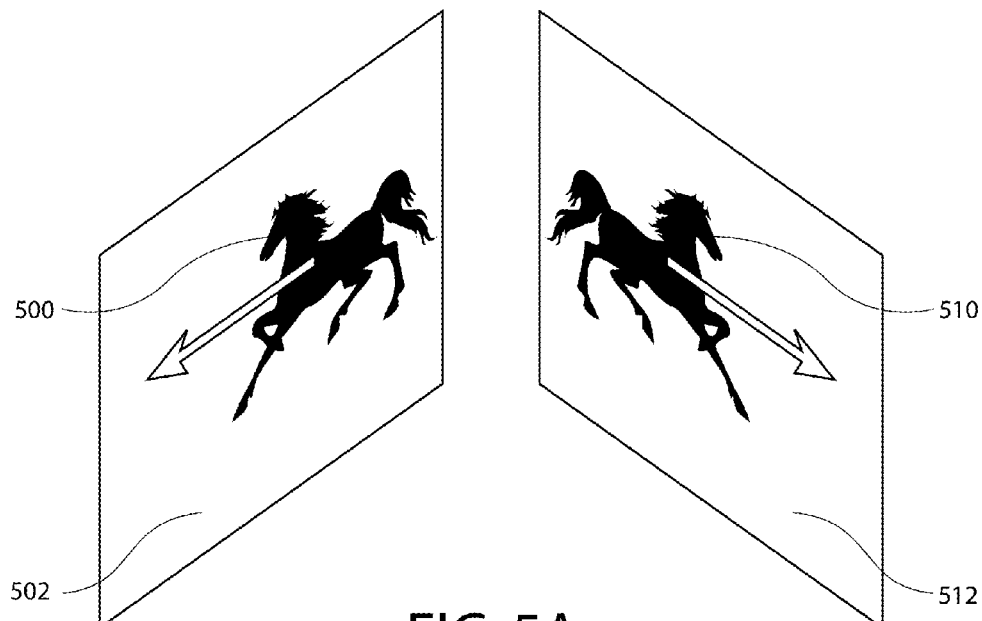
FIGS. 5A-5B are diagrams illustrating a mirror image representation according to at least one example embodiment.
Figure 5B:
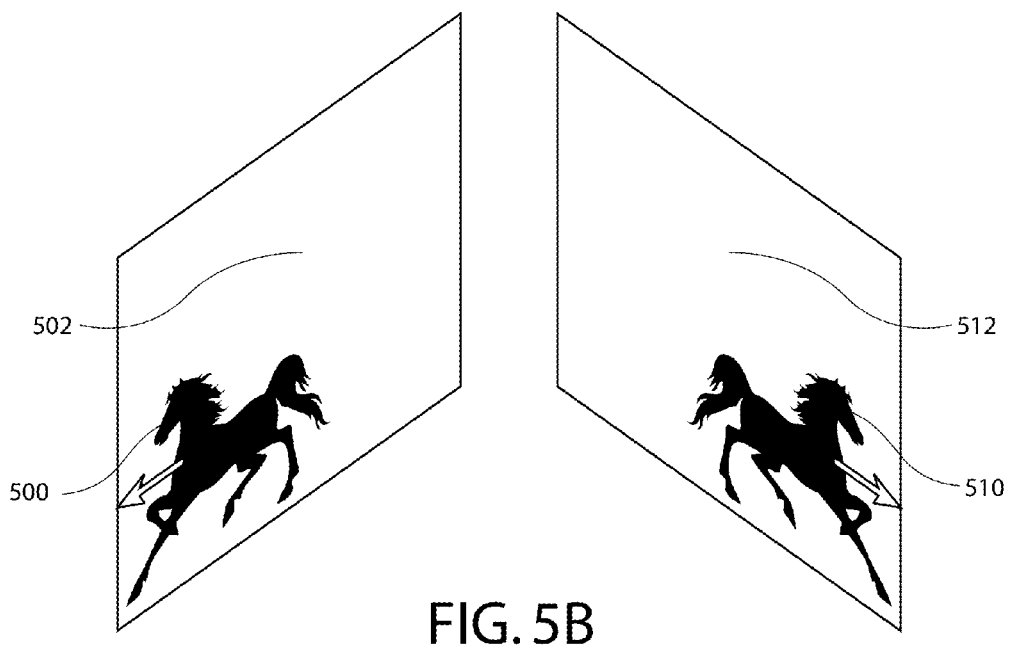

FIGS. 5A-5B are diagrams illustrating a mirror image representation according to at least one example embodiment. The examples of FIGS. 5A-5B are merely examples and do not limit the scope of the claims. For example, correlation between an object and an object representation may vary, type of object may vary, number of objects may vary, number of object representations may vary, and/or the like.

Often when viewing video information on a see through display comprising a window in a vehicle, the video information may appear unnatural. For example, in the example of FIG. 3, a person may be viewing video information displayed on display 306. When video information displayed on display 306 is captured from camera module 312, the video information may appear unnatural to the person viewing display 306, because the field of capture camera module 312 corresponds with the field of view of display 302, which is reversed from the field of view of display 306. For example, if vehicle 300 is moving forward, the motion of objects in the field of view of see through display 302 may appear to be moving in the opposite direction of the car, effectively appearing to outrun the car, when displayed on display 306. Under many circumstances, a person viewing a display with a field of view reversed from the field of capture of the camera module may feel disoriented, particularly while the vehicle is in motion. It may often be desirable that when a see through display is a window on a side of a vehicle opposite the source of the video information, that the see through display displays a mirror image representation of the video image. In many circumstances, the person will perceive this mirror image representation to be more natural from his perspective.

The example of FIGS. 5A-5B illustrate see through display 502 and different display 512. The example of FIGS. 5A-5B illustrate object 500 as viewed through see through display 502. The example of FIGS. 5A-5B illustrate object representation 510 as displayed on different display 512.

Object representation 510 illustrates a mirror image representation of object 500. The example of FIG. 5A illustrates a time earlier than the time at FIG. 5B. The example of FIG. 5B illustrates a time later than the time at FIG. 5A. It can be seen that object 500 is moving from right to left, and that object representation 510 is moving from left to right.

As previously described, the apparatus may cause display of video information associated with a field of view of a display on a different display. In at least one example embodiment, the see through display is a window on a side of a vehicle, and the different display is a different see through display that is a window on an opposite side of the vehicle. In such an example, the apparatus may determine a mirror image representation of the video information, and display the mirror image representation of the video information on the different display. For example, see through display 502 may be a window on a side of a vehicle, and different display 512 may be a different see through display that is a window on an opposite side of the vehicle. For example, see through display 502 may correspond with display 302 of FIG. 3, and display 512 may corresponds with display 306 of FIG. 3. In this manner, the apparatus may display video information on different display 512 in a manner that comprises determination of a mirror image representation of video information representative of object 500, and display a mirror image representation of the video information in the form of object representation 512.

In at least one example embodiment, the apparatus determines that the different display is the different see through display that is the window on the opposite side of the vehicle. In this manner, the determination of the mirror image representation of the video information may be based, at least in part, on the determination that the different display is the different see through display that is a window on an opposite side of the vehicle. The determination that the different display is the different see through display that is the window on the opposite side of the vehicle may be based on information indicative of the location of the display, predetermined information, and/or the like. For example, the apparatus may determine that different display 512 is the different see through display that is opposite the side of the vehicle of see through display 502 based on display configuration information that indicates such a relationship between see through display 502 and different display 512.

Figure 6:
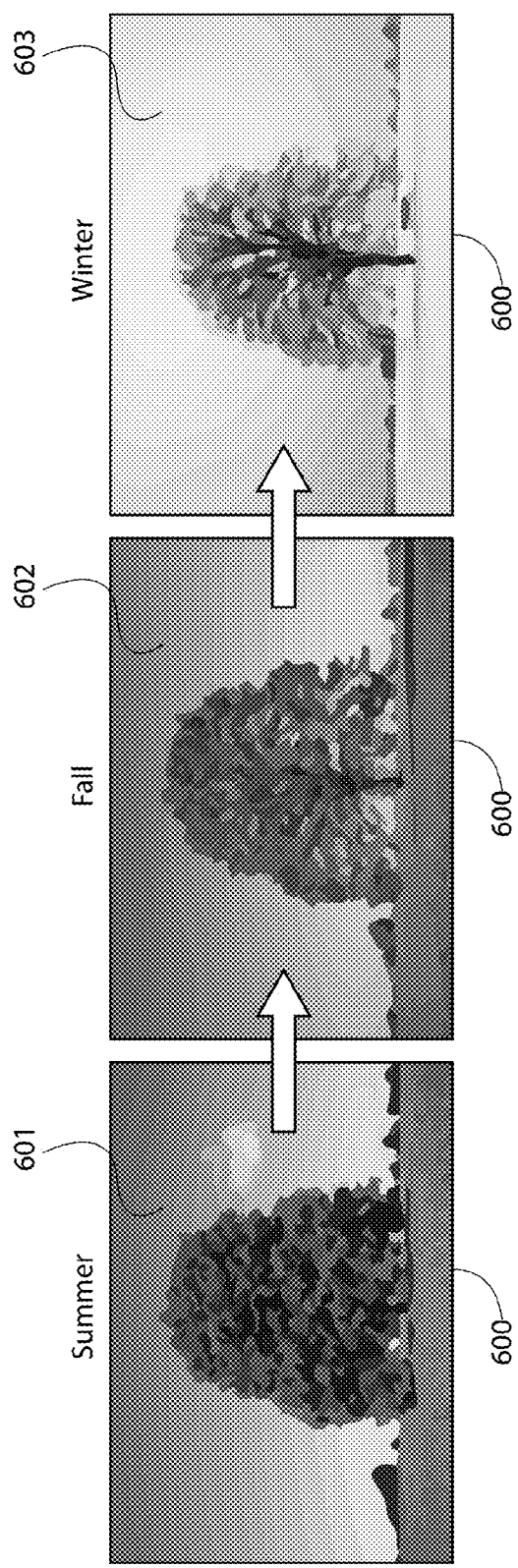
FIG. 6 is a diagram illustrating historical object representations according to at least one example embodiment.

FIG. 6 is a diagram illustrating historical object representations according to at least one example embodiment. The example of FIG. 6 is merely an example and does not limit the scope of the claims. For example, types of historical representations may vary, objects represented in the historical representations may vary, number of historical representations may vary, and/or the like.

In many circumstances, a user may desire to see previously captured visual information. For example, the user may desire to see visual information that corresponds with a previous capture operation, that corresponds with video information captured by a different person, and/or the like. For example, the user may wish to see a representation of an object from a different date, an earlier time of day, a different season, and or the like.

In at least one example embodiment, the apparatus stores video information. In this manner, the stored video information may be referred to as historical video information. In some circumstances, the historical video information may be historical image information. For example, the historical video information may comprises one or more images.

In some circumstances, it may be desirable to receive historical video information from a separate apparatus. For example, it may be desirable to receive historical video information from a server, a repository, and/or the like. For example, there may be a service that provides video information indicative of previously captured video information. In at least one example embodiment, this historical video information may be streamed to the apparatus from such a service. In such circumstances, a user may desire to view such historical video information while the user is at a location that corresponds with the location at which the historical video information was captured. In this manner, the user may be able to perceive differences between the historical video information and the current objects that may be viewed through the see through display.

In some circumstances, the video information may correspond with a three hundred sixty degree visual representation of a location. In this manner, there may be video information that corresponds with multiple fields of capture represented by the video information. In such circumstances, it may be desirable to determine a portion of the three hundred and sixty degree representation that corresponds with a field of view through a see through display. In this manner, the apparatus may cause display of the portion of the three hundred and sixty degree representation on the see through display so that the user can directly compare the portion of the three hundred and sixty degree representation with objects seen through the see through display. In some circumstances, the apparatus may send video information to the service. For example, the user may desire to share the video information with other people that may late be at a similar location.

Figure 7A:
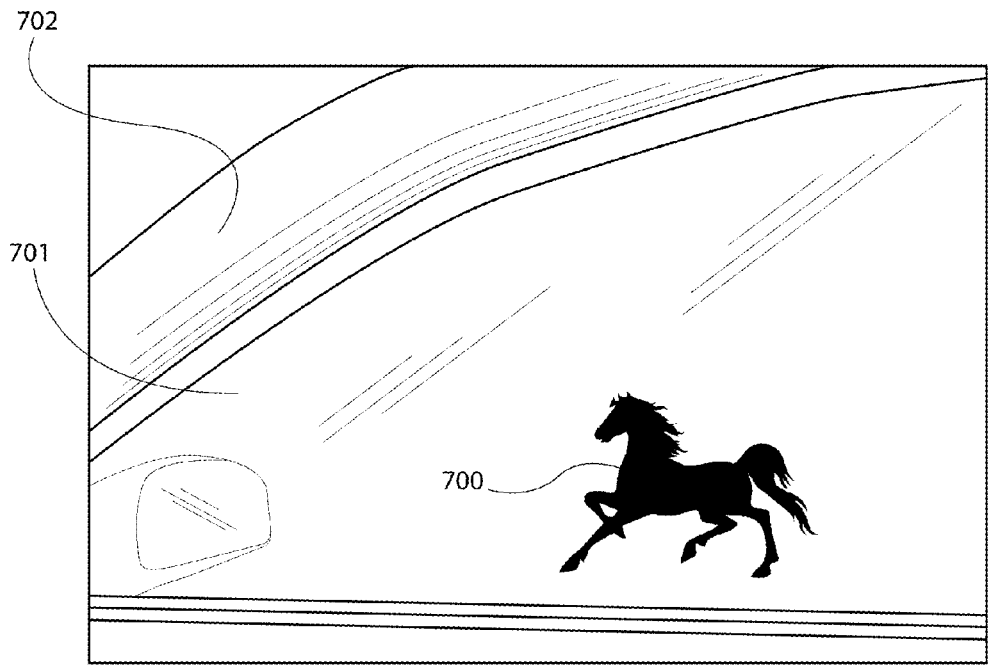
FIGS. 7A-7B are diagrams illustrating movement of a window according to at least one example embodiment.
Figure 7B:
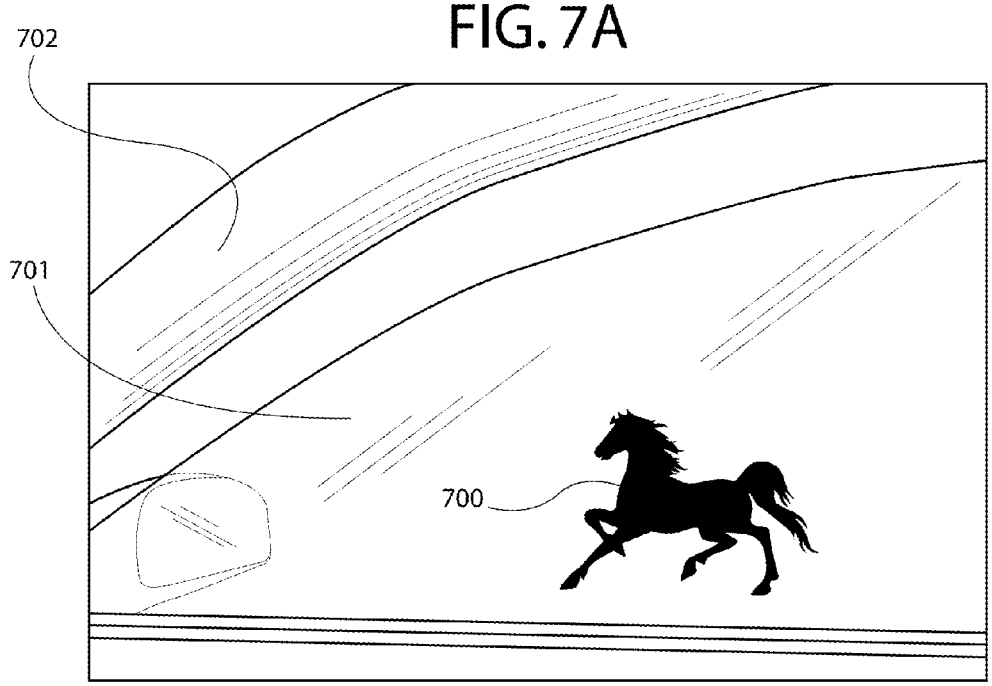

FIGS. 7A-7B are diagrams illustrating movement of a window according to at least one example embodiment. The examples of FIGS. 7A-7B are merely examples and do not limit the scope of the claims. For example, the number of the windows may vary, the orientation of windows may vary, the position of windows may vary, and/or the like.

In many circumstances, a user may desire to partially open a window comprising a see through display. It may often be desirable for such a partially opened window to continue to display at least some of the video information it was displaying before it was partially opened in substantially the same relative position with respect to the window frame. The video information displayed may be an object representation, information about an object viewable through the window similar as described in FIG. 2, and/or the like. It may be desirable that such video information be relocated dynamically as the window partially opened to retain the position of the object representation with respect to the frame of the window. It should be understood that a window may not always be partially opened in the same direction. For example, in some instances, a window may slide up, down, sideways, and/or the like. In such circumstances, the information presented on the display may be relocated as appropriate to the direction of window movement.

The example of FIGS. 7A-7B illustrates object representation 700, display 701, and window frame 702. FIG. 7A illustrates display 701 at a higher position relative to window frame 702 than is illustrated by FIG. 7B. Object representation 700 is displayed on display 701 at approximately the same position relative to window frame 702 in FIGS. 7A-7B.

As previously described, in at least one example embodiment, the different display is a see through display that is a window, and the causation of display of the video information comprises causation of display of the video information at a position on the window. In at least one example embodiment, the apparatus determines that the window has changed from a closed configuration to a partially opened configuration, and determines a different position on the window. In at least one example embodiment, the closed configuration refers to the window being in a configuration that is absent space between the window and the window frame of the window. In at least one example embodiment, the opened configuration refers to a configuration of the window such that the window can no longer increase the amount of space between the window and the window frame of the window. Consequently, a partially opened configuration refers to a configuration that is between the closed configuration and the opened configuration. The apparatus may determine the position of the window by way of a sensor, monitoring of a motor that actuates the window, and/or the like.

In this manner, the apparatus may display the video information at a different position on the window based, at least in part, on the partially opened configuration. For example, as illustrated by FIGS. 7A-7B, the apparatus may determine that display 701 is in a partially opened configuration. As the apparatus determines the position of display 701, the apparatus may display the video information such as object representation 700 is at a different position on the window. In at least one embodiment, the different position is based at least in part on a movement distance of the window from the closed configuration to the partially opened configuration. In at least one example embodiment, the movement distance of the window is a distance that the window has moved towards the opened configuration, towards the closed configuration, and/or the like. In this manner, the apparatus may display the video information at a different position on the window based, at least in part, on a movement distance of the window from the closed configuration to the partially opened configuration. For example, as illustrated by FIGS. 7A-7B, a movement distance can be observed between display 701 and window frame 702. The apparatus may display video information at a different position based on this movement distance. In at least one embodiment, the different position corresponds with transposition of the position by a transposition distance that is substantially equal to the movement distance. A transposition of a position is comprises a movement of the position by a distance in a specified direction. Substantially equal refers to any difference between the movement distance and the transposition distance being attributable to a rounding difference, a pixilation difference, and/or the like. In this manner, the apparatus may cause display of the video information at a different position on the window based, at least in part, on a transposition distance that is substantially equal to the movement distance. For example, it can be seen that object representation 700 has a different position on display 701 in FIGS. 7A-7B relative to the movement distance of display 701 from window frame 702 by way of the apparatus causing display of object representation 700 at a position that corresponds with the movement distance of display 701.

Figure 8A:
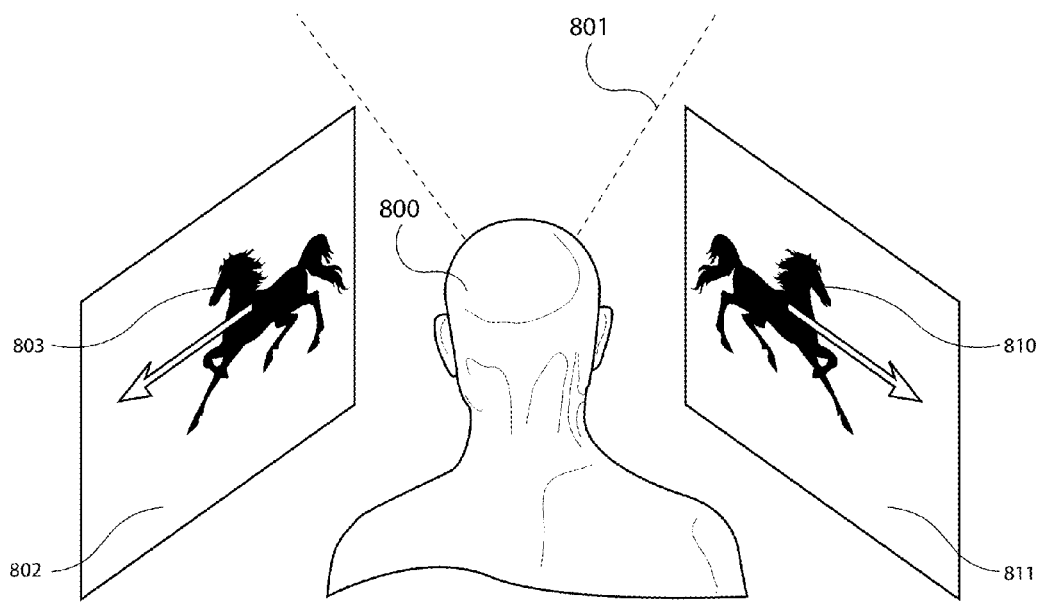
FIGS. 8A-8B are diagrams illustrating a driver field of view according to at least one example embodiment.
Figure 8B:
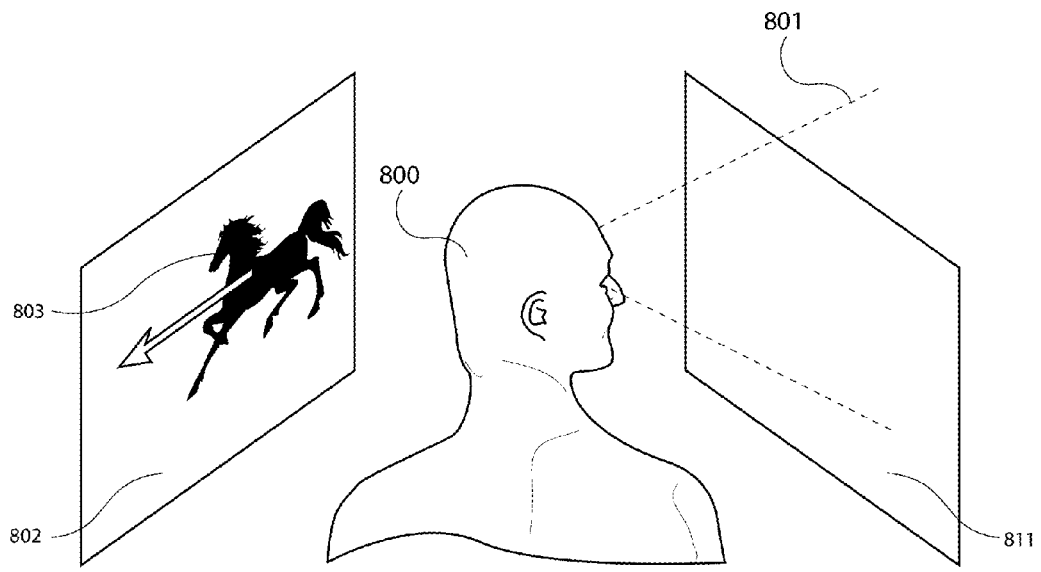

FIGS. 8A-8B are diagrams illustrating a driver field of view according to at least one example embodiment. The examples of FIGS. 8A-8B are merely examples and do not limit the scope of the claims. For example, location of the displays may vary, location of the driver may vary, orientation of the displays may vary, and/or the like.

In many circumstances, a vehicle driver may need to see through a window in the vehicle. During such times, the window may often comprise a see through display. When a see through display is displaying video information, it may obscure the exterior view of the driver. Such obscured view may impair the ability of the driver to safely operate the vehicle. For example, the driver may be unable to see obstructions when making a turn and/or the like. It may often be desirable to disable the display of video information on a see through display when it is in the field of view of the driver. It may often be further desirable to resume the display of video information on a see through display when the see through display is no longer within the field of view of the driver.

The example of FIGS. 8A-8B illustrate driver 800. Driver 800 has a driver field of view 801. The example of FIGS. 8A-8B illustrate see through display 802 and different display 811. The example of FIGS. 8A-8B illustrate object 803 and object representation 810. Object representation 810 is representative of object 803.

In at least one example embodiment the apparatus determines the driver field of view. Determination of the driver field of view may be from gaze tracking, face recognition by way of one or more driver-facing camera modules, head tracking, and/or the like. In at least one example embodiment, the apparatus determines a gaze angle of a driver. A gaze angle may be determined by gaze tracking and/or the like. In this manner the determination of the driver field may be based, at least in part, on the gaze angle of the driver.

As previously described, the apparatus may cause display of video information on a different display. In at least one example embodiment the apparatus determines that the different display has become, at least partially, within a driver field of view. In this manner, the apparatus may terminate display of the video information based, at least in part, on the determination that the different display has become within the driver field of view. In at least one example embodiment, the apparatus determines that the gaze angle of the driver corresponds with a location of the different display. In this manner, the determination that the different display has become within the driver field of view may be based, at least in part, on the determination that the gaze angle of the driver corresponds with the location of the different display. For example, different display 811 may become, at least partially, within driver 800's field of view 801, such as illustrated in FIG. 8B. The apparatus may terminate display of video information on different display 811. For example, the apparatus may terminate display of video information on different display 811 based, at least in part, on different display 811 becoming, at least partially, within field of view 801 of driver 800.

In at least one example embodiment, the apparatus further determines that the different display has become beyond the driver field of view. In this manner, the apparatus may cause display of the video information on the different display based, at least in part, on the determination that the different display has become beyond the driver field of view. For example, as illustrated by FIG. 8A, different display 811 is beyond driver field of view 801. For example, the apparatus may cause display of video information on different display 811 based, at least in part, on different display 811 being beyond field of view 801 of driver 800.

Figure 9:
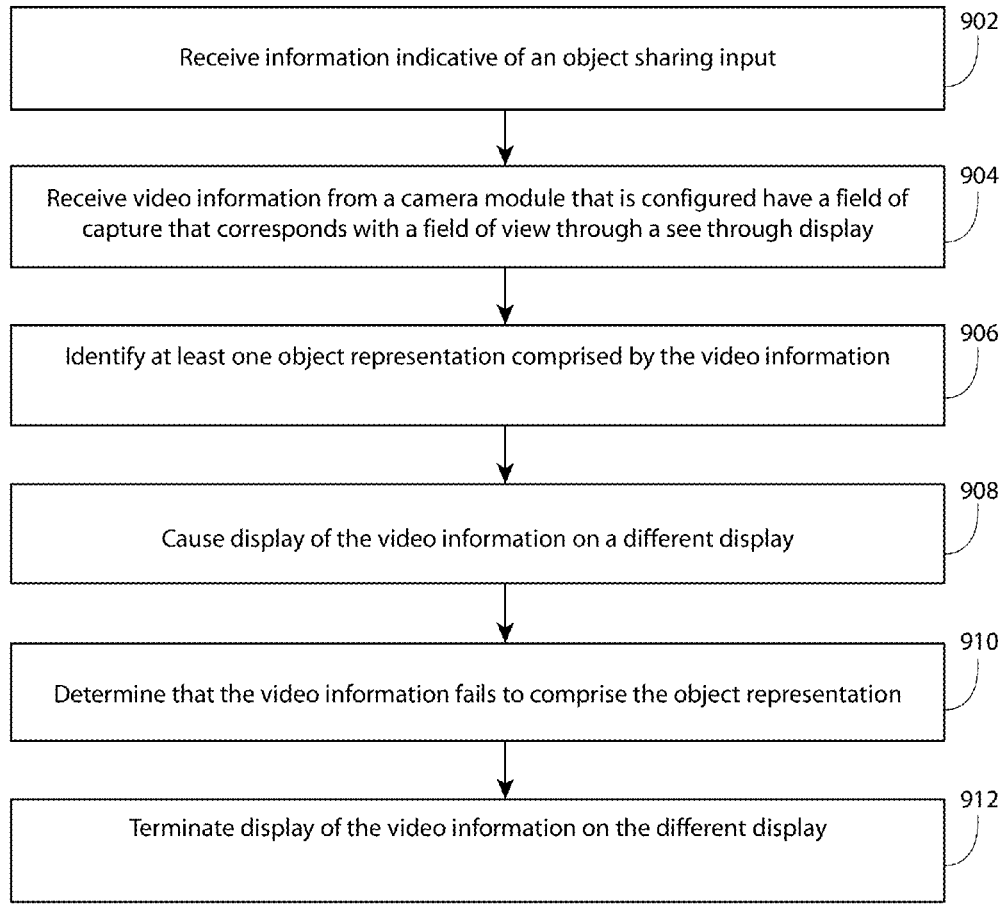
FIG. 9 is a flow diagram illustrating activities associated with display of video information on a display according to at least one example embodiment.

FIG. 9 is a flow diagram illustrating activities associated with display of video information on a display according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

At block 902, the apparatus receives information indicative of an object sharing input. The receipt and the object sharing input may be similar as described regarding FIGS. 4A-4D.

At block 904, the apparatus receives video information from a camera module that is configured to have a field of capture that corresponds with a field of view through a see through display. The receipt, the video information, the camera module, the field of capture, the field of view, and the field of capture may be similar as described regarding FIG. 1, FIG. 2, FIG. 3, and FIGS. 4A-4D.

At block 906, the apparatus identifies at least one object representation comprised by the video information. The identification and the object representation may be similar as described regarding FIGS. 4A-4D.

At block 908, the apparatus causes display of the video information on a different display. The display and the different display may be similar as described regarding FIG. 3, FIGS. 4A-4D, FIGS. 5A-5B, FIGS. 7A-7B, and FIGS. 8A-8B.

At block 910, the apparatus determines that the video information fails to comprise the object representation. The determination may be similar as described regarding FIGS. 4A-4D.

At block 912, the apparatus terminates display of the video information on the different display. The termination may be similar as described regarding FIGS. 4A-4D. In this manner, the termination of display of the video information on the different display may be based, at least in part, on the determination that the video information fails to comprise the object representation. For example, the termination of display of the video information on the different display may be caused, at least in part, by the determination that the video information fails to comprise the object representation.

Figure 10:
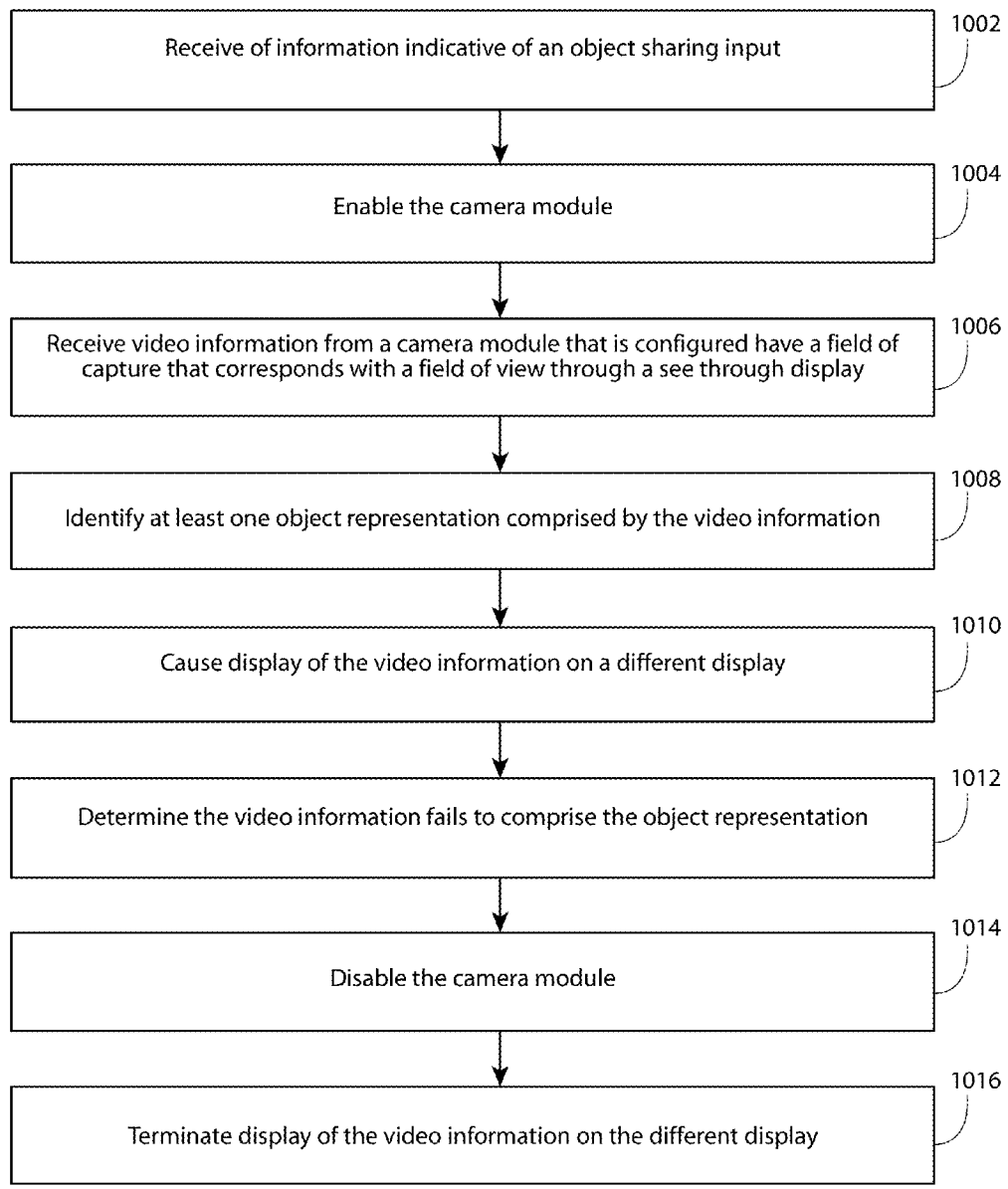
FIG. 10 is a flow diagram illustrating activities associated with display of video information on a display according to at least one example embodiment.

FIG. 10 is a flow diagram illustrating activities associated with display of video information on a display according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As previously described, in some circumstances, it may be desirable to enable and/or disable the camera module.

At block 1002, the apparatus receives information indicative of an object sharing input, similarly as described regarding block 902 of FIG. 9. At block 1004, the apparatus enables the camera module. The enablement may be similar as described regarding FIG. 3.

At block 1006, the apparatus receives video information from a camera module that is configured to have a field of capture that corresponds with a field of view through a see through display, similarly as described regarding block 904 of FIG. 9. In this manner, the receipt of the video information from the camera module may be caused, at least in part, by the enablement of the camera module.

At block 1008, the apparatus identifies at least one object representation comprised by the video information, similarly as described regarding block 906 of FIG. 9. At block 1010, the apparatus causes display of the video information on a different display, similarly as described regarding block 908 of FIG. 9. At block 1012, the apparatus determines that the video information fails to comprise the object representation, similarly as described regarding block 910 of FIG. 9.

At block 1014, the apparatus disables the camera module. The disablement may be similar as described regarding FIG. 3. At block 1016, the apparatus terminates display of the video information on the different display, similarly as described regarding block 912 of FIG. 9. In this manner, the termination of display of the video information may be based, at least in part, on the disablement of the camera module. For example, the termination of display of the video information may be caused, at least in part, by the disablement of the camera module.

Figure 11:
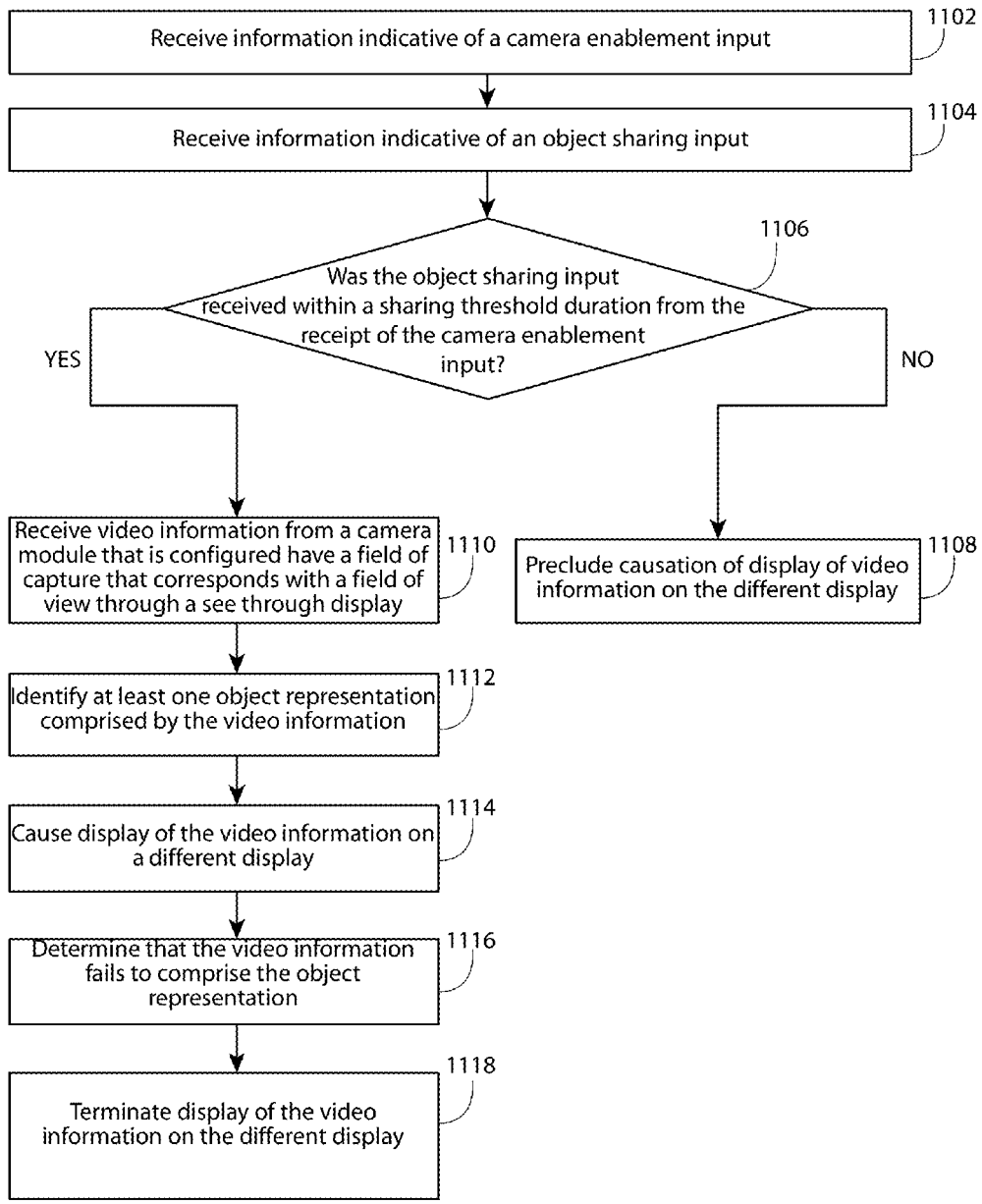
FIG. 11 is a flow diagram illustrating activities associated with display of video information on a display according to at least one example embodiment.

FIG. 11 is a flow diagram illustrating activities associated with display of video information on a display according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

In some circumstances, it may be desirable determine an object sharing input is received within a particular duration from the receipt of a camera enablement input. For example, it may be desirable to avoid receiving video information due to accidental user input. In this manner, such a duration may help guard against accidental input.

In at least one example embodiment, the apparatus determines whether an object sharing input is received within a sharing threshold duration from the receipt of a camera enablement input. In at least one example embodiment, a sharing threshold duration is a duration of time, within which the apparatus will allow receipt of an object sharing input. In this manner, the apparatus may predicate receipt of video information on a determination that object sharing input is received within the sharing threshold duration from the receipt of a camera enablement input. For example, if the apparatus determines that the sharing threshold duration has elapsed since the receipt of the other camera enablement input, the apparatus may preclude display of video information on the different display.

At block 1102, the apparatus receives information indicative of a camera enablement input. The receipt and camera enablement input may be similar as described regarding FIGS. 4A-4D.

At block 1104, the apparatus receives information indicative of an object sharing input, similarly as described regarding block 902 of FIG. 9. At block 1106, the apparatus determines whether the object sharing input was received within a sharing threshold duration from the receipt of the camera enablement input. If the apparatus determines that the object sharing input was received within a sharing threshold duration from the receipt of the camera enablement input, flow proceeds to block 1110. If the apparatus determines that the sharing threshold duration has elapsed since the receipt of the other camera enablement input, flow proceeds to block 1108.

At block 1108, the apparatus precludes causation of display of video information on the different display. In this manner, the apparatus may preclude causation of display of video information on the different display based, at least in part, on the determination that the sharing threshold duration has elapsed since the receipt of the other camera enablement input. For example, the preclusion of causation of display of video information on the different display may be caused, at least in part, by the determination that the sharing threshold duration has elapsed since the receipt of the other camera enablement input.

At block 1110, the apparatus receives video information from a camera module that is configured to have a field of capture that corresponds with a field of view through a see through display, similarly as described regarding block 904 of FIG. 9. At block 1112, the apparatus identifies at least one object representation comprised by the video information, similarly as described regarding block 906 of FIG. 9.

At block 1114, the apparatus causes display of the video information on a different display, similarly as described regarding block 908 of FIG. 9. In this manner, the causation of display of the video information on the different display may be based, at least in part, on the determination that the object sharing input was received within the sharing threshold duration from the receipt of the camera enablement input. For example, the causation of display of the video information on the different display may be caused, at least in part, by the determination that the object sharing input was received within the sharing threshold duration from the receipt of the camera enablement input.

At block 1116, the apparatus determines that the video information fails to comprise the object representation, similarly as described regarding block 910 of FIG. 9. At block 1118, the apparatus terminates display of the video information on the different display, similarly as described regarding block 912 of FIG. 9.

Figure 12:
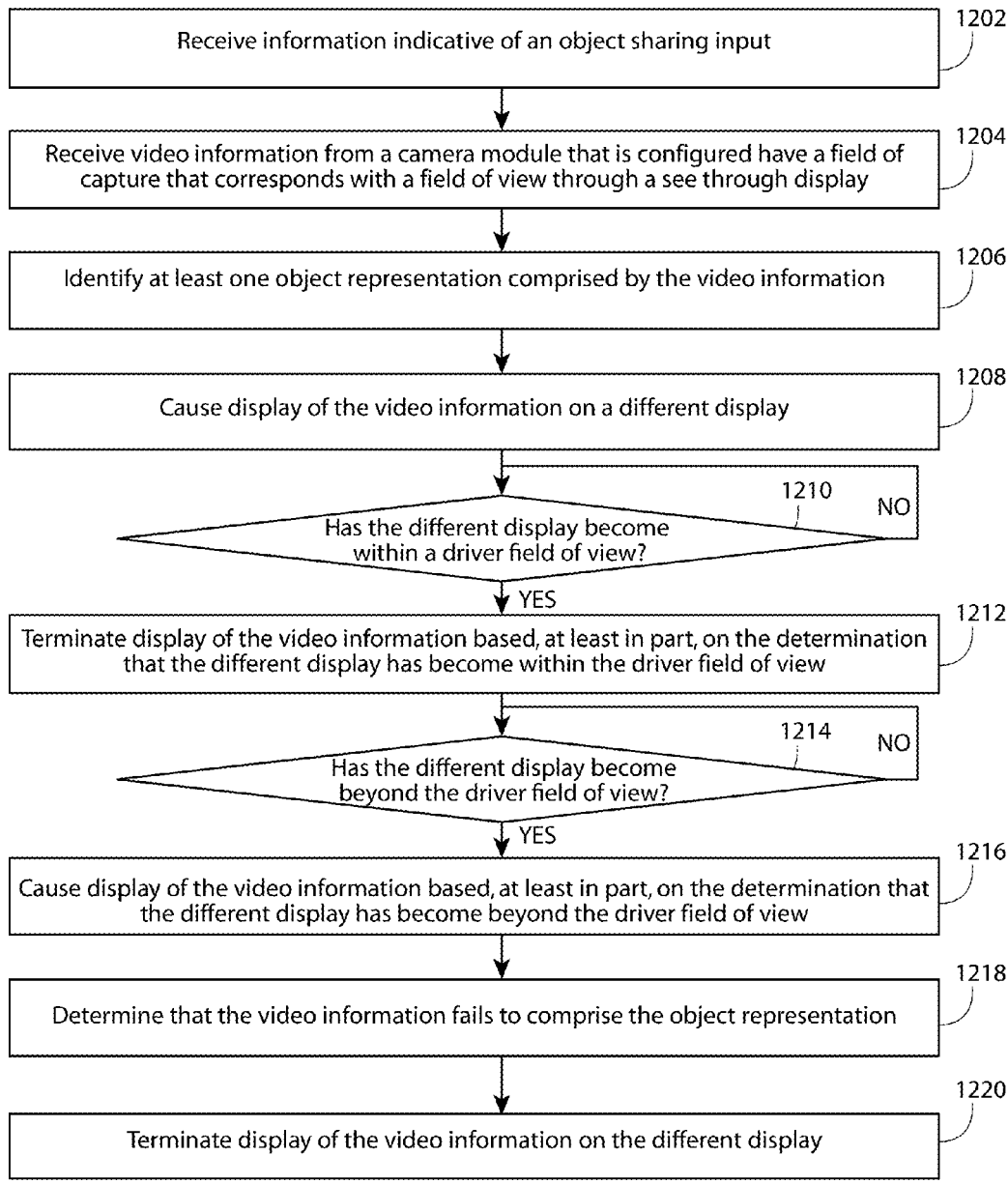
FIG. 12 is a flow diagram illustrating activities associated with display of video information on a display according to at least one example embodiment.

FIG. 12 is a flow diagram illustrating activities associated with display of video information on a display according to at least one example embodiment. In at least one example embodiment, there is a set of operations that corresponds with the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

As previously described, in some circumstances, it may be desirable to temporarily disable display of video information on a different display.

At block 1202, the apparatus receives information indicative of an object sharing input, similarly as described regarding block 902 of FIG. 9. At block 1204, the apparatus receives video information from a camera module that is configured to have a field of capture that corresponds with a field of view through a see through display, similarly as described regarding block 904 of FIG. 9. At block 1206, the apparatus identifies at least one object representation comprised by the video information, similarly as described regarding block 906 of FIG. 9. At block 1208, the apparatus causes display of the video information on a different display, similarly as described regarding block 908 of FIG. 9.

At block 1210, the apparatus determines that the different display has become, at least partially, within a driver field of view. The determination and the driver field of view may be similar as described regarding FIGS. 8A-8B.

At block 1212, the apparatus terminates display of the video information based, at least in part, on the determination that the different display has become within the driver field of view. The termination may be similar as described regarding FIGS. 8A-8B.

At block 1214, the apparatus determines that the different display has become beyond the driver field of view. The determination may be similar as described regarding FIGS. 8A-8B.

At block 1216, the apparatus causes display of the video information based, at least in part, on the determination that the different display has become beyond the driver field of view. For example, the apparatus may cause display of the video information on the different display. The display and the different display may be similar as described regarding FIG. 3, FIGS. 4A-4D, FIGS. 5A-5B, FIGS. 7A-7B, and FIGS. 8A-8B.

At block 1218, the apparatus determines that the video information fails to comprise the object representation, similarly as described regarding block 910 of FIG. 9. At block 1220, the apparatus terminates display of the video information on the different display, similarly as described regarding block 912 of FIG. 9.

Figure 13:
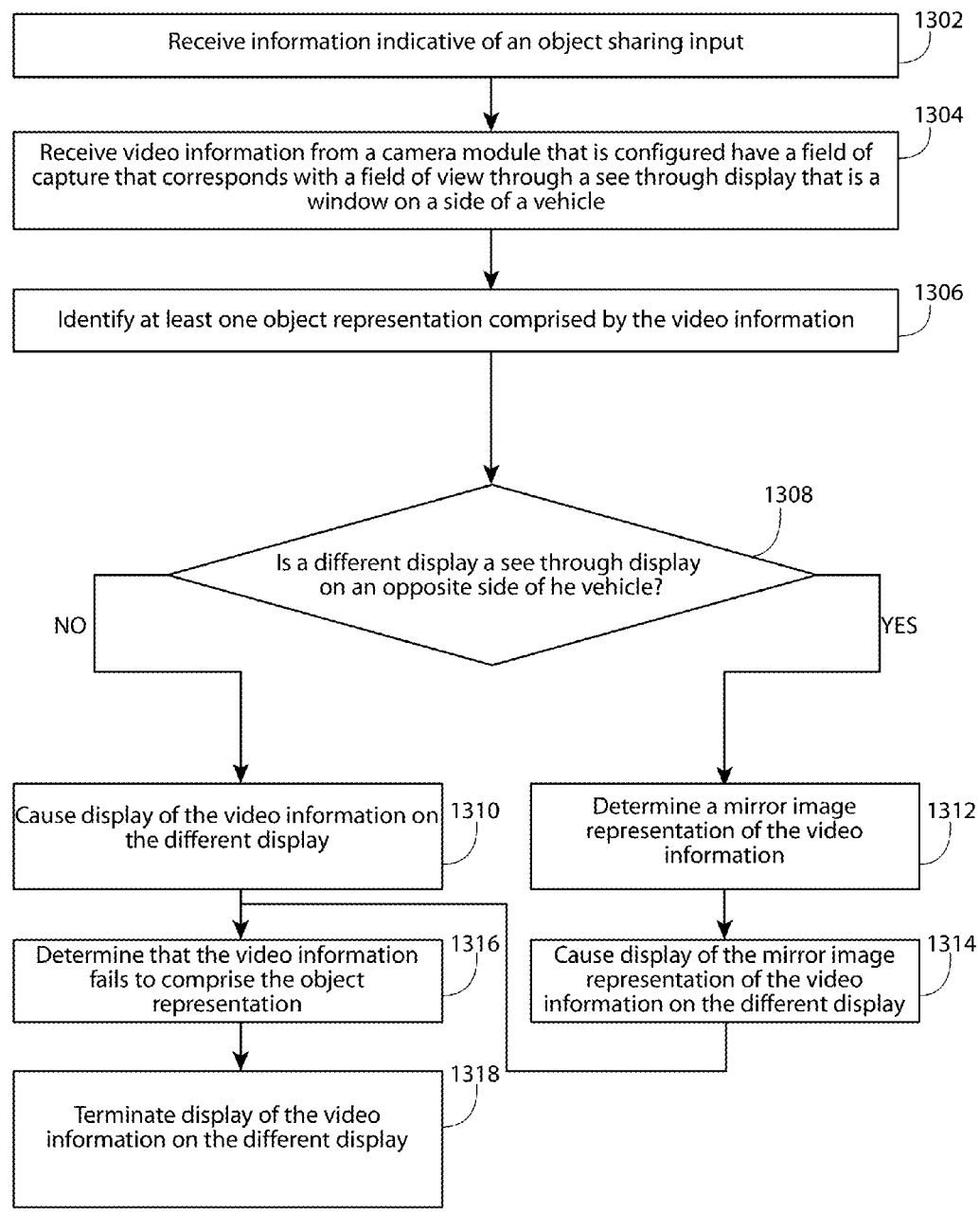
FIG. 13 is a flow diagram illustrating activities associated with display of video information on a display according to at least one example embodiment.

FIG. 13 is a flow diagram illustrating activities associated with display of video information on a display according to at least one example embodiment. In at least one example embodiment, there is a set of operations that corresponds with the activities of FIG. 13. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 13.

As previously described, in some circumstances, it may be desirable for a different display to display a mirror image representation of the video information.

At block 1302, the apparatus receives information indicative of an object sharing input, similarly as described regarding block 902 of FIG. 9. At block 1304, the apparatus receives video information from a camera module that is configured to have a field of capture that corresponds with a field of view through a see through display, similarly as described regarding block 904 of FIG. 9. At block 1306, the apparatus identifies at least one object representation comprised by the video information, similarly as described regarding block 906 of FIG. 9.

At block 1308, the apparatus determines that the different display is the different see through display that is the window on the opposite side of the vehicle. The determination may be similar as described regarding FIGS. 5A-5B. If the apparatus determines that the different display is the different see through display that is the window on the opposite side of the vehicle, flow proceeds to block 1312. If the apparatus determines the different display is a display other than the different see through display that is the window on the opposite side of the vehicle, flow proceeds to block 1310.

At block 1310, the apparatus causes display of the video information on the different display, similarly as described regarding block 908 of FIG. 9. At block 1312, the apparatus determines a mirror image representation of the video information. The determination and the mirror image representation may be similar as described regarding FIGS. 5A-5B. In this manner, the apparatus may determine the mirror image representation of the video information is based, at least in part, on the determination that the different display is the different see through display that is a window on an opposite side of the vehicle. For example, the determination of the mirror image representation of the video information may be based, at least in part, on the determination that the different display is the different see through display that is a window on an opposite side of the vehicle.

At block 1314, the apparatus causes display of the mirror image representation of the video information on the different display. The causation of display may be similar as described regarding FIGS. 5A-5B.

At block 1316, the apparatus determines that the video information fails to comprise the object representation, similarly as described regarding block 910 of FIG. 9. At block 1318, the apparatus terminates display of the video information on the different display, similarly as described regarding block 912 of FIG. 9.

Figure 14:
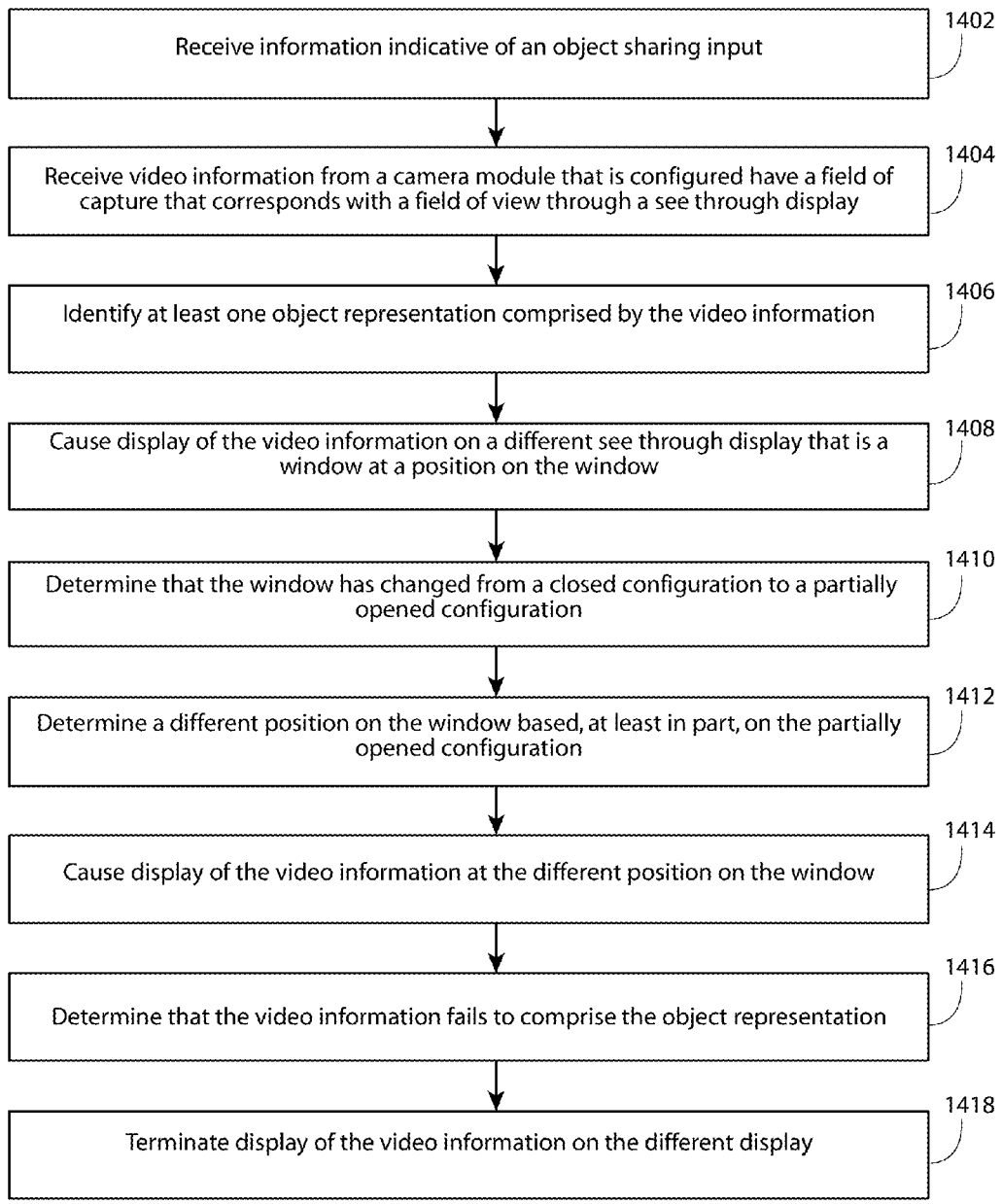
FIG. 14 is a flow diagram illustrating activities associated with display of video information on a display according to at least one example embodiment.

FIG. 14 is a flow diagram illustrating activities associated with display of video information on a display according to at least one example embodiment. In at least one example embodiment, there is a set of operations that corresponds with the activities of FIG. 14. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 14.

As previously described, in some circumstances, it may be desirable to position the video information displayed on window comprising a see through display relative to the position of the window.

At block 1402, the apparatus receives information indicative of an object sharing input, similarly as described regarding block 902 of FIG. 9. At block 1404, the apparatus receives video information from a camera module that is configured to have a field of capture that corresponds with a field of view through a see through display, similarly as described regarding block 904 of FIG. 9. At block 1406, the apparatus identifies at least one object representation comprised by the video information, similarly as described regarding block 906 of FIG. 9.

At block 1408, the apparatus causes display of the video information on a different see through display that is a window at a position on the window. The causation of display and the window may be similar as described regarding FIGS. 7A-7B and block 908 of FIG. 9.

At block 1410, the apparatus determines that the window has changed from a closed configuration to a partially opened configuration. The determination may be similar as described regarding FIGS. 7A-7B.

At block 1412, the apparatus determines a different position on the window based, at least in part, on the partially opened configuration. The determination may be similar as described regarding FIGS. 7A-7B.

At block 1414, the apparatus causes display of the video information at the different position on the window. The displaying may be similar as described regarding FIGS. 7A-7B.

At block 1416, the apparatus determines that the video information fails to comprise the object representation, similarly as described regarding block 910 of FIG. 9. At block 1418, the apparatus terminates display of the video information on the different display, similarly as described regarding block 912 of FIG. 9.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 906 of FIG. 9 may be performed after block 908 of FIG. 9. Furthermore, if desired, one or more of the above-described functions may be optional or may be combined. For example, block 1004 of FIG. 10 may be optional and/or combined with block 1006 of FIG. 10.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
    at least one processor; and
    at least one memory including computer program code, the memory and the computer program code configured to, working with the processor, cause the apparatus to perform at least the following:
    receive information indicative of an object sharing input;
    receive video information from a camera module that is configured to have a field of capture that corresponds with a field of view through a see through display;
    identify of at least one object representation comprised by the video information, the object representation being a visual representation of an object that is within the field of view of the see through display;
    cause display of the video information on a different display;
    determine that the video information fails to comprise the object representation; and
    terminate display of the video information on the different display based, at least in part, on the determination that the video information fails to comprise the object representation;

wherein the different display is comprised in a vehicle, and wherein the memory includes computer program code configured to, working with the processor, cause the apparatus to:
 determine that the different display has become, at least partially, within a driver field of view;
 terminate display of the video information based, at least in part, on the determination that the different display has become within the driver field of view;
 determine that the different display has become beyond the driver field of view; and
 cause display of the video information on the different display based, at least in part, on the determination that the different display has become beyond the driver field of view.

2. The apparatus of claim 1, wherein the memory includes computer program code configured to, working with the processor, cause the apparatus to:
 cause enablement of the camera module, wherein the receipt of the video information from the camera module is based, at least in part, on the enablement of the camera module; and
 cause disablement of the camera module, wherein termination of display of the video information is based, at least in part, on the disablement of the camera module.

3. The apparatus of claim 2, wherein the memory includes computer program code configured to, working with the processor, cause the apparatus to receive information indicative of a camera enablement input, wherein the enablement of the camera module is based, at least in part, on the camera enablement input.

4. The apparatus of claim 3, wherein the memory includes computer program code configured to, working with the processor, cause the apparatus determine that the object sharing input was received within a sharing threshold duration from the receipt of the camera enablement input, wherein the causing display of the video information on the different display is based at least in part, on the determination that the object sharing input was received within the sharing threshold duration from the receipt of the camera enablement input.

5. The apparatus of claim 4, wherein the memory includes computer program code configured to, working with the processor, cause the apparatus to:
 receive information indicative of another camera enablement input;
 receive other video information from the camera module;
 determine that the sharing threshold duration has elapsed since the receipt of the other camera enablement input; and
 preclude causing display of the other video information on the different display.

6. The apparatus of claim 1, wherein the see through display comprises a window on a side of the vehicle, the different display comprises a different see through display that is a window on an opposite side of the vehicle, and causing display of the video information on the different display comprises:
 determining a mirror image representation of the video information; and
 causing display of the mirror image representation of the video information.

7. The apparatus of claim 1, wherein the different display comprises a see through display that is a window, and the causing display of the video information comprises causing of the video information at a position on the window, and wherein the memory includes computer program code configured to, working with the processor, cause the apparatus to:
 determine that the window has changed from a closed configuration to a partially opened configuration;
 determine a different position on the window based, at least in part, on the partially opened configuration; and
 cause display of the video information at the different position on the window.

8. The apparatus of claim 1, wherein the apparatus comprises the see through display.

9. A method comprising:
 receiving information indicative of an object sharing input;
 receiving video information from a camera module that is configured to have a field of capture that corresponds with a field of view through a see through display;
 identifying at least one object representation comprised by the video information, the object representation being a visual representation of an object that is within the field of view of the see through display;
 causing display of the video information on a different display;
 determining that the video information fails to comprise the object representation; and
 terminating display of the video information on the different display based, at least in part, on the determination that the video information fails to comprise the object representation;
 wherein the different display is comprised in a vehicle, and wherein the method comprises the further steps of:
 determining that the different display has become, at least partially, within a driver field of view;
 terminating display of the video information based, at least in part, on the determination that the different display has become within the driver field of view;
 determining that the different display has become beyond the driver field of view; and
 causing display of the video information on the different display based, at least in part, on the determination that the different display has become beyond the driver field of view.

10. The method of claim 9, further comprising:
 causing enablement of the camera module, wherein the receipt of the video information from the camera module is based, at least in part, on the enablement of the camera module; and
 causing disablement of the camera module, wherein termination of display of the video information is based, at least in part, on the disablement of the camera module.

11. The method of claim 10, further comprising receiving information indicative of a camera enablement input, wherein the enablement of the camera module is based, at least in part, on the camera enablement input.

12. The method of claim 11, further comprising determining that the object sharing input was received within a sharing threshold duration from the receipt of the camera enablement input, wherein causing display of the video information on the different display is based at least in part, on the determination that the object sharing input was received within the sharing threshold duration from the receipt of the camera enablement input.

13. The method of claim 12, further comprising:
 receiving information indicative of another camera enablement input;

receiving other video information from the camera module;

determining that the sharing threshold duration has elapsed since the receipt of the other camera enablement input; and precluding causing display of the other video information on the different display.

14. The method of claim 9, wherein the see through display comprises a window on a side of the vehicle, the different display comprises a different see through display that is a window on an opposite side of the vehicle, and causing display of the video information on the different display comprises:

determining a mirror image representation of the video information; and causing display of the mirror image representation of the video information.

15. At least one non-transitory computer-readable medium encoded with instructions that, when executed by a processor, cause an apparatus to:

receive information indicative of an object sharing input;

receive video information from a camera module that is configured to have a field of capture that corresponds with a field of view through a see through display;

identify at least one object representation comprised by the video information, the object representation being a visual representation of an object that is within the field of view of the see through display;

cause display of the video information on a different display;

determine that the video information fails to comprise the object representation; and terminate display of the video information on the different display based, at least in part, on the determination that the video information fails to comprise the object representation;

wherein the different display is comprised in a vehicle, and wherein the non-transitory computer-readable medium is further encoded with instruction that, when executed by the processor, cause the apparatus to:

determine that the different display has become, at least partially, within a driver field of view;

terminate display of the video information based, at least in part, on the determination that the different display has become within the driver field of view;

determine that the different display has become beyond the driver field of view; and cause display of the video information on the different display based, at least in part, on the determination that the different display has become beyond the driver field of view.

16. The non-transitory computer-readable medium of claim 15, further encoded with instructions that, when executed by the processor:

cause enablement of the camera module, wherein the receipt of the video information from the camera module is based, at least in part, on the enablement of the camera module; and cause disablement of the camera module, wherein termination of display of the video information is based, at least in part, on the disablement of the camera module.

17. The non-transitory computer readable medium of claim 16, further encoded with instructions that, when executed by the processor, cause the apparatus to receive information indicative of a camera enablement input, wherein the enablement of the camera module is based, at least in part, on the camera enablement input.

18. The non-transitory computer readable medium of claim 17, further encoded with instructions that, when executed by the processor, cause the apparatus to determine that the object sharing input was received within a sharing threshold duration from the receipt of the camera enablement input, wherein causing display of the video information on the different display is based at least in part, on the determination that the object sharing input was received within the sharing threshold duration from the receipt of the camera enablement input.

* * * * *